(12) United States Patent
Kim et al.

(10) Patent No.: US 9,377,572 B2
(45) Date of Patent: Jun. 28, 2016

(54) BACKLIGHT UNIT AND DISPLAY APPARATUS HAVING THE SAME

(71) Applicant: Samsung Display Co., Ltd., Yongin, Gyeonggi-Do (KR)

(72) Inventors: Heugon Kim, Yongin-si (KR); JooYoung Kim, Suwon-si (KR); Jin Seo, Osan-si (KR); Insun Hwang, Suwon-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/319,180

(22) Filed: Jun. 30, 2014

(65) Prior Publication Data

US 2015/0177440 A1  Jun. 25, 2015

(30) Foreign Application Priority Data

Dec. 19, 2013 (KR) .................. 10-2013-0159538

(51) Int. Cl.
*F21V 8/00* (2006.01)

(52) U.S. Cl.
CPC .............. *G02B 6/001* (2013.01); *G02B 6/0053* (2013.01); *G02B 6/0096* (2013.01); *G02B 6/0021* (2013.01); *G02B 6/0043* (2013.01)

(58) Field of Classification Search
CPC .... G02B 6/001; G02B 6/0016; G02B 6/0018; G02B 6/0038; G02B 6/0051; G02B 6/0053; G02B 6/0055; G02B 6/0063; G02B 6/0093; G02B 6/0043; G02B 6/0025; G02B 6/0031; G02B 6/0035; G02B 6/0075; G02F 1/133504; G02F 1/133615; G02F 1/133524; G02F 2001/133342; G02F 1/133603; G02F 1/133605; F21Y 2101/02; F21Y 2111/005; F21Y 2105/001; F21Y 2103/003; F21S 48/1241; F21S 48/2237; F21S 48/2268; F21V 2200/15; F21V 7/04; G09F 13/08
USPC .......... 362/23.16, 97.1–97.4, 217.05, 249.02, 362/326, 330, 333, 335, 336, 551, 555, 559, 362/561, 600, 606–613, 615, 617, 620, 362/623; 349/57, 58, 61, 62, 64, 65
See application file for complete search history.

(56) References Cited

U.S. PATENT DOCUMENTS

| | | | |
|---|---|---|---|
| 5,835,661 A * | 11/1998 | Tai et al. ........................ | 385/146 |
| 6,104,371 A | 8/2000 | Wang et al. | |
| 6,955,453 B2 * | 10/2005 | Kunimochi et al. .......... | 362/333 |
| 7,101,055 B2 * | 9/2006 | Hsieh et al. ................... | 362/97.2 |
| 7,195,364 B2 * | 3/2007 | Hahm et al. ................... | 362/23.1 |

(Continued)

FOREIGN PATENT DOCUMENTS

| | | | |
|---|---|---|---|
| JP | 05080716 A | 4/1993 | |
| JP | 09184921 A | 7/1997 | |

(Continued)

*Primary Examiner* — Hargobind S Sawhney
(74) *Attorney, Agent, or Firm* — Cantor Colburn LLP

(57) ABSTRACT

A backlight unit includes a light source which emits a first light, a light guide bar extending in a first direction, where the light guide bar receives the first light through an incident surface thereof, and guides the first light to convert the first light to a second light, and a control pattern disposed on a surface of the light guide bar, which extends in the first direction, where the control pattern converts the second light to a third light, and has a shape extending in the first direction to control an exit angle of the third light.

25 Claims, 21 Drawing Sheets

(56) References Cited

U.S. PATENT DOCUMENTS

| | | | |
|---|---|---|---|
| 7,207,709 B2 * | 4/2007 | Chuang et al. | 362/633 |
| 7,497,609 B2 | 3/2009 | Maeda et al. | |
| 7,630,037 B2 * | 12/2009 | Shimura | G02B 6/0056 349/115 |
| 7,661,862 B2 * | 2/2010 | Lee et al. | 362/559 |
| 7,766,533 B2 * | 8/2010 | Liu et al. | 362/616 |
| 7,777,833 B2 * | 8/2010 | Hwang | G02B 6/0038 349/61 |
| 7,837,376 B2 * | 11/2010 | Wu | G02B 6/0063 362/607 |
| 8,052,295 B2 * | 11/2011 | Kim et al. | 362/97.3 |
| 8,297,773 B2 * | 10/2012 | Kuromizu | 362/97.2 |
| 8,690,380 B2 * | 4/2014 | Sato et al. | 362/217.05 |
| 8,702,265 B2 * | 4/2014 | May | 362/147 |
| 8,876,320 B2 * | 11/2014 | Ying | 362/97.3 |
| 2002/0131275 A1 | 9/2002 | Yamamoto et al. | 362/555 |
| 2005/0231973 A1 * | 10/2005 | Cassarly et al. | 362/551 |
| 2005/0264716 A1 | 12/2005 | Kim et al. | |
| 2006/0034579 A1 | 2/2006 | Sugiura | |
| 2006/0103776 A1 | 5/2006 | Park | |
| 2007/0236642 A1 * | 10/2007 | Chen | G02F 1/133615 349/149 |
| 2008/0084708 A1 | 4/2008 | Lee et al. | |
| 2009/0052204 A1 | 2/2009 | Kawashima et al. | |
| 2009/0147179 A1 * | 6/2009 | Yamashita et al. | 349/64 |
| 2010/0027293 A1 * | 2/2010 | Li | G02B 6/002 362/619 |
| 2011/0013419 A1 | 1/2011 | Horng et al. | |
| 2014/0320783 A1 * | 10/2014 | Han | 349/64 |

FOREIGN PATENT DOCUMENTS

| | | | | |
|---|---|---|---|---|
| JP | 10288782 A | | 10/1998 | |
| JP | 2000047038 A | | 2/2000 | |
| JP | 2001210122 A | | 8/2001 | |
| JP | 2003162914 A | * | 6/2003 | ............... F21V 8/00 |
| JP | 2003242818 A | * | 8/2003 | ............... F21V 8/00 |
| JP | 2004047297 A | | 2/2004 | |
| JP | 2004079488 A | | 3/2004 | |
| JP | 2005166321 A | | 6/2005 | |
| JP | 2006054088 A | * | 2/2006 | |
| JP | 2006126731 A | | 5/2006 | |
| JP | 2006156039 A | | 6/2006 | |
| JP | 2006251075 A | | 9/2006 | |
| JP | 2006278077 A | | 10/2006 | |
| JP | 2009176436 A | | 8/2009 | |
| JP | 4946603 B2 | | 3/2012 | |
| KR | 100277816 B1 | | 10/2000 | |
| KR | 100438522 B1 | | 6/2004 | |
| KR | 1020050070437 A | | 7/2005 | |
| KR | 1020050101498 A | | 10/2005 | |
| KR | 1020060028576 A | | 3/2006 | |
| KR | 1020060033572 A | | 4/2006 | |
| KR | 1020060056183 A1 | | 5/2006 | |
| KR | 1020060057837 A | | 5/2006 | |
| KR | 1020060072455 A | | 6/2006 | |
| KR | 1020060094794 A | | 8/2006 | |
| KR | 1020060095144 A | | 8/2006 | |
| KR | 1020060105346 A | | 10/2006 | |
| KR | 100705704 B1 | | 4/2007 | |
| KR | 1020070063109 A | | 6/2007 | |
| KR | 1020070076838 A | | 7/2007 | |
| KR | 100818478 B1 | | 3/2008 | |
| KR | 1020080072344 A | | 8/2008 | |
| KR | 1020130003827 A | | 1/2013 | |

* cited by examiner

BACKLIGHT UNIT AND DISPLAY APPARATUS HAVING THE SAME

This application claims priority to Korean Patent Application No. 10-2013-0159538, filed on Dec. 19, 2013, and all the benefits accruing therefrom under 35 U.S.C. §119, the content of which in its entirety is herein incorporated by reference.

BACKGROUND

1. Field

The disclosure relates to a backlight unit and a display apparatus including the backlight unit. More particularly, the disclosure relates to a backlight unit having a slim size and a display apparatus including the backlight unit.

2. Description of the Related Art

In general, a flat panel display apparatus includes a display panel to display an image, a backlight unit to provide light to the display panel, and a bottom chassis to accommodate the backlight unit.

The backlight unit is classified into an edge-illumination type backlight unit and a direct-illumination type backlight unit according to a position of a light source that emits the light. The edge-illumination type backlight unit has a relatively thin thickness compared to the direct-illumination type backlight unit, and thus the edge-illumination type backlight unit is widely used in a portable display device.

The direct-illumination type backlight unit includes light sources disposed under the display panel. When the display apparatus employs the direct-illumination type backlight unit, it may be difficult to reduce the thickness of the display apparatus and to improve brightness uniformity.

SUMMARY

The disclosure provides a backlight unit with reduced thickness and improved brightness uniformity.

The disclosure provides a display apparatus having the backlight unit.

According to exemplary embodiments of the invention, a backlight unit includes a light source which emits a first light, a light guide bar extending substantially in a first direction, where the light guide bar receives the first light through an incident surface thereof, and guides the first light to convert the first light to a second light, and a control pattern disposed on a surface of the light guide bar, which extends substantially in the first direction, where the control pattern converts the second light to a third light, and has a shape extending in the first direction to control an exit angle of the third light.

According to other exemplary embodiments of the invention, a display apparatus includes a backlight unit including a light source which emits a first light, a light guide bar extending in a first direction, where the light guide bar receives the first light through an incident surface thereof, and guides the first light to convert the first light to a second light, a control pattern disposed on a surface of the light guide bar, which extends substantially in the first direction, where the control pattern converts the second light to a third light, and has a shape extending in the first direction to control an exit angle of the third light, and a diffusion plate that diffuses the third light, and a display panel which receives the diffused light exiting from the diffusion plate to display an image.

According to exemplary embodiments described herein, a line light source is disposed at one end of the light guide bar as the light source instead of a point light source, and thus the number of the light sources may be reduced. In such embodiments, the control pattern disposed on the side surfaces of the light guide bar controls the exit angle of the light exiting from the light guide bar, such that the brightness may be effectively prevented from increasing in the area in which the light guide bar is disposed. Thus, the uniformity of the brightness of an exemplary embodiment of the display apparatus may be improved.

BRIEF DESCRIPTION OF THE DRAWINGS

The above and other features of the disclosure will become readily apparent by reference to the following detailed description when considered in conjunction with the accompanying drawings wherein.

DETAILED DESCRIPTION

Figure 1:
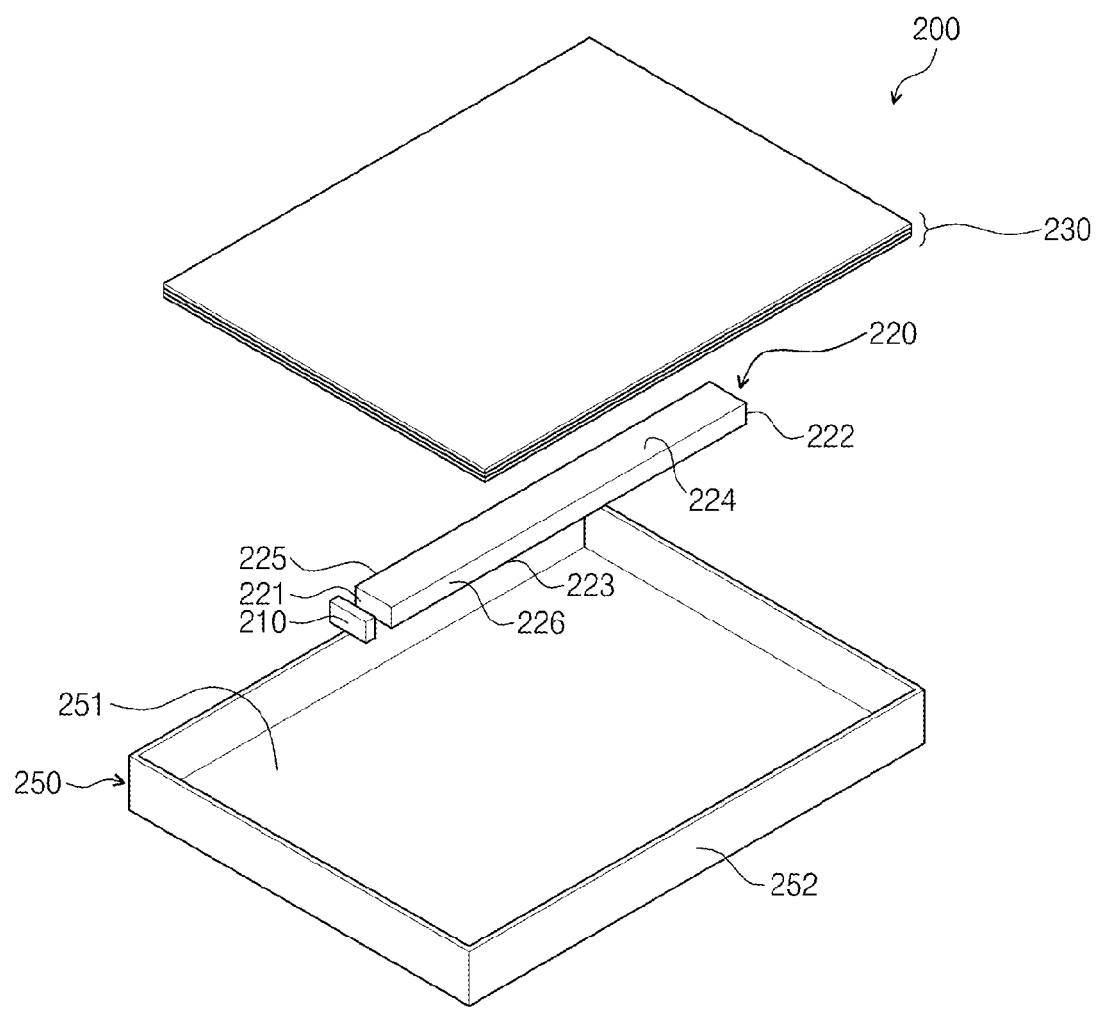
FIG. 1 is an exploded perspective view of an exemplary embodiment of a backlight unit according to the invention.

The invention will be described more fully hereinafter with reference to the accompanying drawings, in which various embodiments are shown. The invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the invention will be described in detail with reference to the accompanying drawings.

Figure 2:
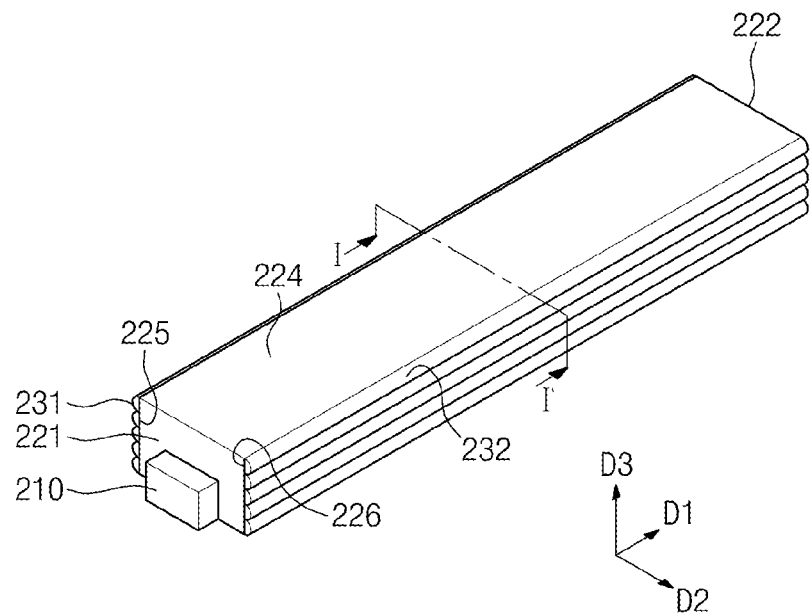
FIG. 2 is a perspective view showing an exemplary embodiment of a light source and a light guide bar shown in FIG. 1.
Figure 3:
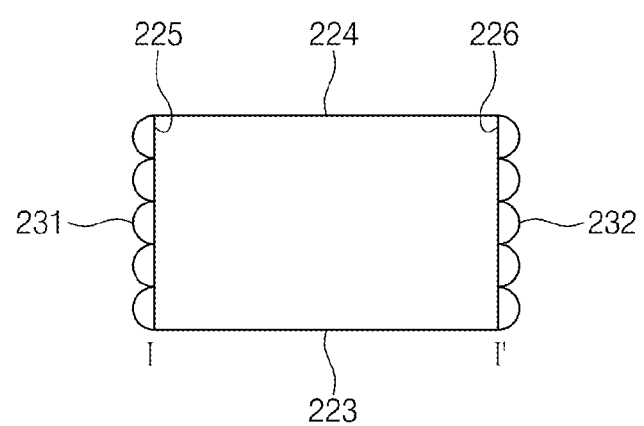
FIG. 3 is a cross-sectional view taken along line I-I' shown in FIG. 2.

FIG. 1 is an exploded perspective view of an exemplary embodiment of a backlight unit according to the invention, FIG. 2 is a perspective view of an exemplary embodiment of a light source and a light guide bar shown in FIG. 1, and FIG. 3 is a cross-sectional view taken along line I-I' shown in FIG. 2.

Referring to FIGS. 1 and 2, an exemplary embodiment of a backlight unit 200 includes a light source 210 that emits a first light, a light guide bar 220 that guides the first light to a first direction D1, and a bottom chassis 250 that accommodates the light source 210 and the light guide bar 220.

The light source 210 may include a light emitting diode. In an exemplary embodiment, the backlight unit 200 may further include a support film (not shown), on which the light source 210 is disposed or mounted.

In an exemplary embodiment, as shown in FIG. 2, the light guide bar 220 has a bar shape elongated substantially in the first direction D1. The light guide bar 220 includes an incident surface 221, an opposite surface 222, an upper surface 224, a bottom surface 223, a first side surface 225 and a second side surface 226. The light guide bar 220 receives the first light through the incident surface 221 disposed at one end thereof and totally reflects the first light to guide the first light to the first direction D1. In an exemplary embodiment, the light guide bar 220 may include a light exit pattern that allows the totally reflected first light to exit through the upper surface 224 or the first and second sides surfaces 225 and 226 to the outside of the light guide bar 220. The light exit pattern will be described later in detail later with reference to FIGS. 11 and 12. Here, the light exiting through the upper surface 224 and the first and second side surfaces 225 and 226 will be referred to as a second light.

The opposite surface 222 is disposed at the other end of the light guide bar 220, which is opposite to the one end of the light guide bar 220. In an exemplary embodiment, as shown in FIG. 1, the light source 210 is not disposed at the opposite surface 222, but not being limited thereto. In an alternative exemplary embodiment, an additional light source 210 may be disposed at the opposite surface 222 such that a total light amount of the backlight unit 200 may be enhanced.

In an exemplary embodiment, the bottom surface 223 faces a bottom portion 251 of the bottom chassis 250, the upper surface 224 faces the bottom surface 223, and the first and second side surfaces 225 and 226 connect the bottom surface 223 and the upper surface 224.

In an exemplary embodiment, as shown in FIG. 2, the backlight unit 200 includes a control pattern defined or disposed on a surface of the light guide bar 220, which is elongated substantially in the first direction D1, to convert the second light to a third light. In one exemplary embodiment, for example, the control pattern includes a first control pattern 231 disposed on the first side surface 225 of the light guide bar 220 and a second control pattern 232 disposed on the second side surface 226 of the light guide bar 220. In such an embodiment, the first and second control patterns 231 and 232 extend substantially in the first direction D1 to control an exit angle of the third light. Herein, the exit angle is defined as an angle of light exits from the backlight unit 200, e.g., the third light, with respect to an imaginary line in the third direction and an exit direction of the third light, that is, a direction to which the third light exits.

Referring to FIG. 3, the light guide bar 220 has a rectangular shape when viewed from a transverse cross-sectional view thereof, which is a view when the light guide bar 200 is cut along a second direction D2, i.e., a widthwise direction of the light guide bar 220, substantially perpendicular to the first direction D1. In an alternative exemplary embodiment, four corners of the light guide bar 220 may be rounded.

In an exemplary embodiment, the first and second control patterns 231 and 232 may have a lenticular lens shape. In such an embodiment, a plurality of lenticular lenses are arranged on each of the first and second side surfaces 225 and 226 along a thickness direction D3 (hereinafter, referred to as a third direction) of the light guide bar 220.

In an exemplary embodiment, the first and second control patterns 231 and 232 may be provided or formed by processing the first and second side surfaces 225 and 226 of the light guide bar 220, respectively. In one exemplary embodiment, for example, the first and second control patterns 231 and 232 having the lenticular lens shape may be formed by irradiating a laser beam on the first and second side surfaces 225 and 226.

Referring back to FIG. 1, the backlight unit 200 further includes a plurality of optical sheets 230 disposed on the light guide bar 220.

The optical sheets 230 include a diffusion sheet that diffuses the light and a prism sheet that condenses the light to improve brightness and viewing angle of the third light. In such an embodiment, the optical sheets 230 may further include a protective sheet (not shown) disposed at an uppermost position thereof.

The bottom chassis 250 includes the bottom portion 251, on which the light source 210 and the light guide bar 220 are placed, and a sidewall 252 substantially vertically extending from the bottom portion 251. In one exemplary embodiment, for example, the bottom chassis 250 may include or be formed of a metal.

Figure 4:
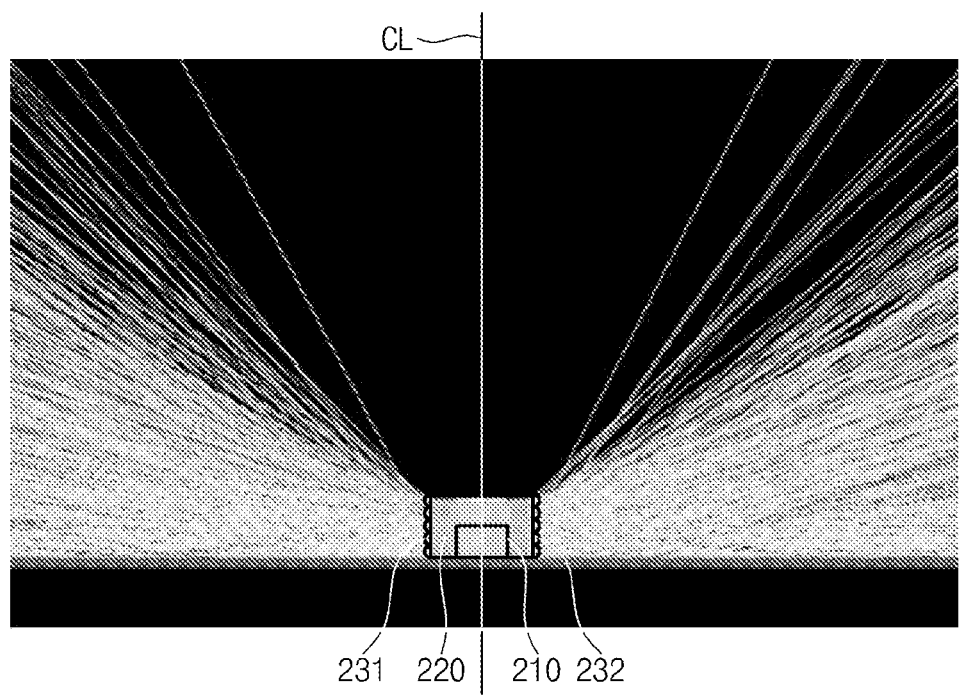
FIG. 4 is a side view showing a profile of lights exiting from an exemplary embodiment of the light guide bar.
Figure 5:
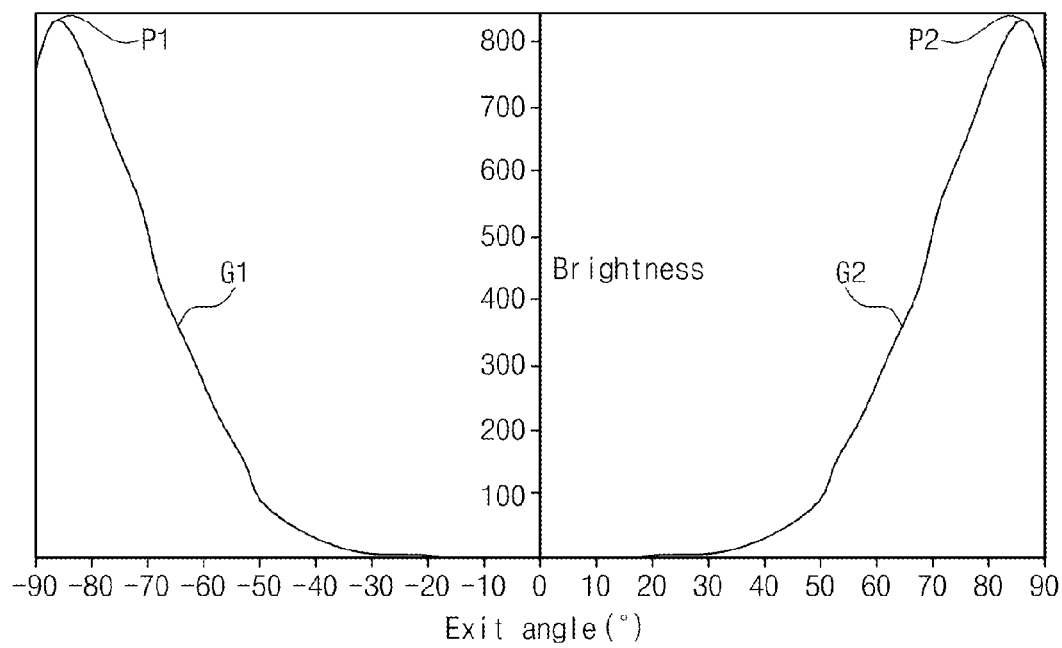
FIG. 5 is a graph showing brightness versus light exit angle in an exemplary embodiment of the light guide bar.
Figure 6:
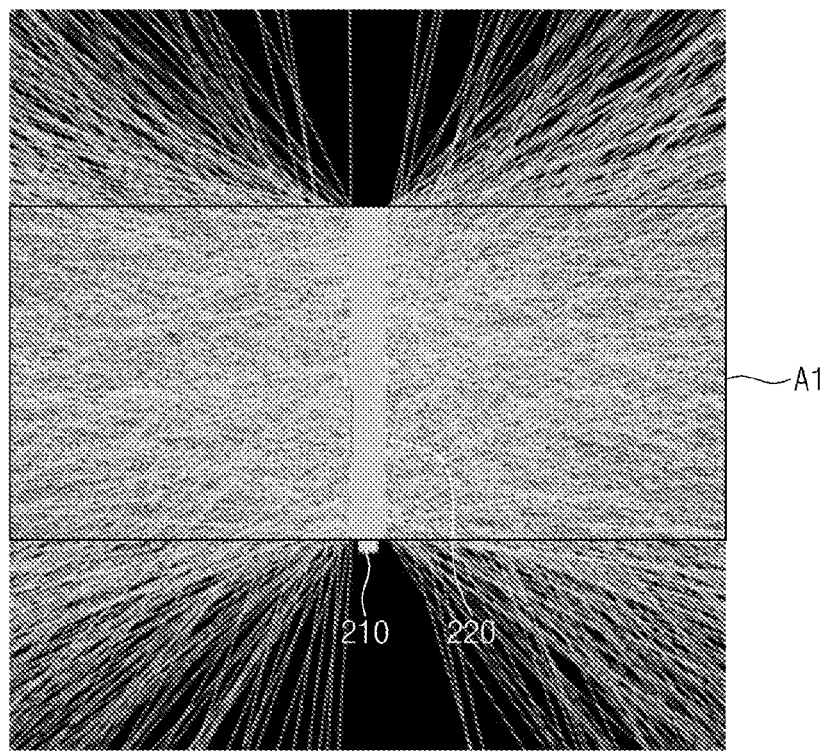
FIG. 6 is a plan view showing a profile of lights exiting from an exemplary embodiment of the light guide bar.

FIG. 4 is a side view showing a profile of lights exiting from an exemplary embodiment of the light guide bar, FIG. 5 is a graph showing the brightness versus light exit angle in an exemplary embodiment of the light guide bar, and FIG. 6 is a plan view showing a profile of lights exiting from an exemplary embodiment of the light guide bar.

FIG. 4 shows the profile of the light exiting from an exemplary embodiment of the light guide bar 220 from a front view of the incident surface 221 of the light guide bar 220. Referring to FIG. 4, the first light emitted from the light source 210 is guided by the light guide bar 220 and exits through the first and second control patterns 231 and 232 to travel in left and right directions with respect to a center line CL crossing a center portion of the light guide bar 220.

In one exemplary embodiment, for example, the first control pattern 231 and the second control pattern 232, which have substantially the same shape and density as each other, may be respectively disposed on the first and second side surfaces 225 and 226 of the light guide bar 220, as shown in FIG. 3. In such an embodiment, the first and second control patterns 231 and 232 may be substantially symmetrical to each other with respect to the center line CL.

Hereinafter, the light exiting through the first control pattern 231 will be referred to as a left light, and the light exiting through the second control pattern 232 will be referred to as a right light. The exit angle of the left light is controlled by the first control pattern 231, and the exit angle of the right light is controlled by the second control pattern 232. In such an embodiment, where the first and second control patterns 231 and 232 are symmetrical to each other with respect to the center line CL, a light exit distribution of the left light may be substantially symmetrical to a light exit distribution of the right light with reference to the center line CL.

In FIG. 5, an x-axis represents the exit angle against the center line CL, and a y-axis represents the brightness in accordance with the exit angle. A first graph G1 represents the brightness in accordance with the exit angle of the left light and a second graph G2 represents the brightness in accordance with the exit angle of the right light.

The exit angle is defined by the center line CL crossing the center portion of the light guide bar 220 and the left and right lights. As described above, since the first and second control patterns 231 and 232 have substantially the same shape and density, the left light has a profile similar to a profile of the right light.

As shown in FIG. 5, the left light has a peak brightness P1 at the exit angle of about −85 degrees, and the right light has a peak brightness P2 at the exit angle of about +85 degrees.

In a light guide bar, when the exit pattern is not disposed on the upper surface 224 of the light guide bar 220, the brightness may be substantially zero in the exit angle of about zero (0) to about ±20 degrees, and the brightness is equal to or less than about ⅛ of the peak brightnesses P1 and P2 in the exit angle of about −50 degrees to about +50 degrees.

As described above, the exit angles of the left and right lights may be controlled by using the first and second control patterns 231 and 232 respectively disposed on the first and second side surfaces 225 and 226 of the light guide bar 220. In an exemplary embodiment, the first control patterns 231 may control the left light such that the peak brightness P1 of the left light is located between the center line CL and the exit angle of about −80 degrees to about −90 degrees, and the second control patterns 232 may control the right light such that the peak brightness P2 of the right light is located between the center line CL and the exit angle of about +80 degrees to about +90 degrees.

In an exemplary embodiment, the first and second control patterns 231 and 232 control the exit angle of the third light to enhance the amount of the light traveling to a side portion A1 of the backlight unit 200 and to effectively prevent the third light from being concentrated at the area in which the light guide bar 220 is disposed, i.e., a center portion of the backlight unit 200.

Accordingly, as shown in FIG. 6, in an exemplary embodiment where the light guide bar 220 is disposed at the center portion of the backlight unit 200, the light may be effectively and uniformly provided to the side portion A1 of the backlight unit 200.

Figure 7:
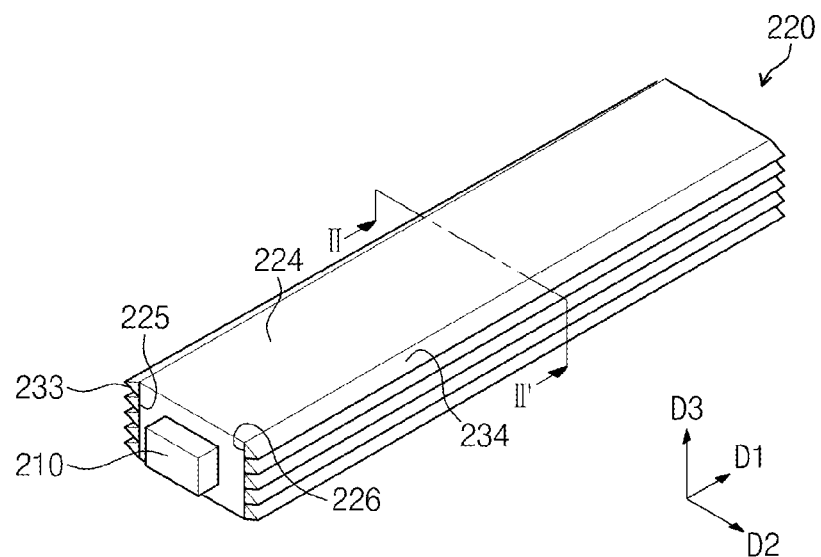
FIG. 7 is a perspective view of an alternative exemplary embodiment of a backlight unit according to the invention.
Figure 8:
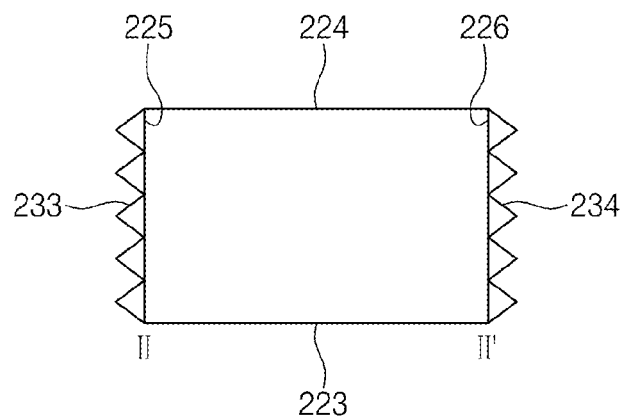
FIG. 8 is a cross-sectional view taken along line II-II' shown in FIG. 7.

FIG. 7 is a perspective view showing an alternative exemplary embodiment of a backlight unit according to the invention, and FIG. 8 is a cross-sectional view taken along line II-II' shown in FIG. 7. The backlight unit in FIGS. 7 and 8 is substantially the same as the backlight unit shown in FIGS. 1 and 2 except for the control pattern. The same or like elements shown in FIGS. 7 and 8 have been labeled with the same reference characters as used above to describe the exemplary embodiments of the backlight unit shown in FIGS. 2 and 3, and any repetitive detailed description thereof will hereinafter be omitted or simplified.

Referring to FIGS. 7 and 8, an exemplary embodiment of a backlight unit 200 includes a control pattern disposed on a surface of the light guide bar 220, which is elongated in the first direction D1, to convert the second light to the third light. In one exemplary embodiment, for example, the control pattern includes a third control pattern 233 disposed on the first side surface 225 of the light guide bar 220 and a fourth control pattern 234 disposed on the second side surface 226 of the light guide bar 220. In such an embodiment, the third and fourth control patterns 233 and 234 have a shape extending in the first direction D1 to control the exit angle of the third light.

In such an embodiment, the light guide bar 220 has the rectangular shape when viewed from the transverse cross-sectional view thereof.

In an exemplary embodiment, as shown in FIG. 8, the third and fourth control patterns 231 and 232 have a prism shape. In such an embodiment, a plurality of prisms is arranged on each of the first and second side surfaces 225 and 226 along the third direction D3.

Figure 9:
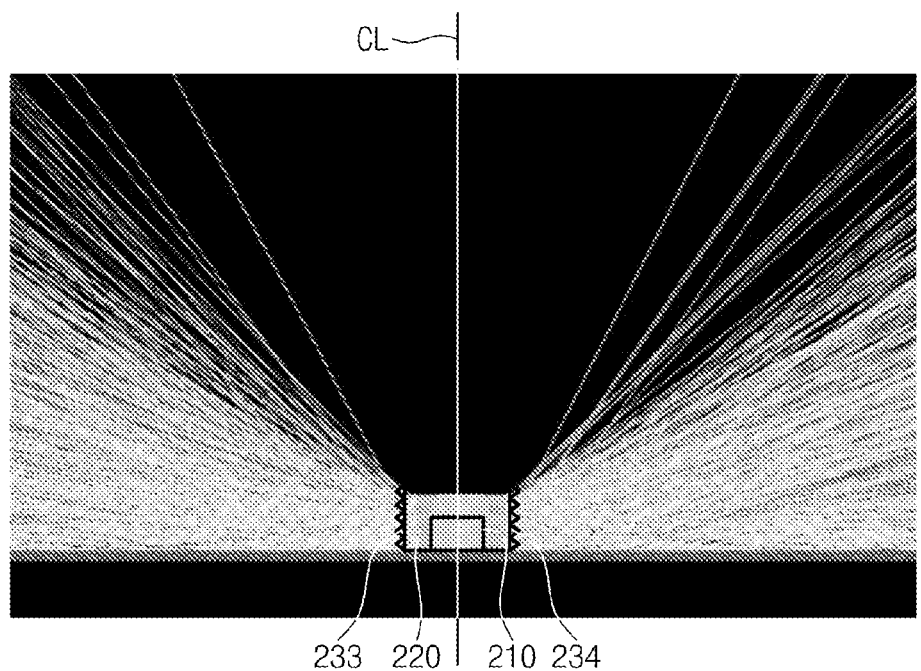
FIG. 9 is a side view showing a profile of lights exiting from an exemplary embodiment of the light guide bar.
Figure 10:
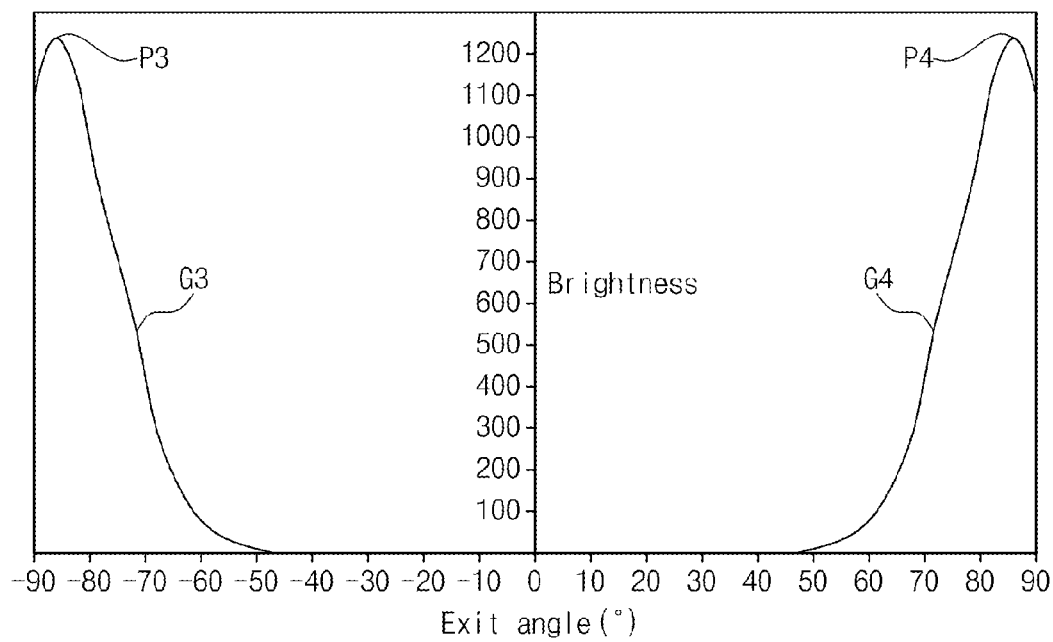
FIG. 10 is a graph showing brightness versus light exit angle in an exemplary embodiment of the light guide bar.

FIG. 9 is a side view showing a profile of lights exiting from an exemplary embodiment of the light guide bar, and FIG. 10 is a graph showing the brightness versus light exit angle in an exemplary embodiment of the light guide bar.

FIG. 9 shows the profile of the light exiting from an exemplary embodiment of the light guide bar 220 (e.g., the third light) from a front view of the incident surface 221 of the light guide bar 220. Referring to FIG. 9, the first light emitted from the light source 210 is guided by the light guide bar 220 and exits through the third and fourth control patterns 233 and 234 to travel in left and right directions with respect to a center line CL crossing a center portion of the light guide bar 220. In one exemplary embodiment, for example, the third control pattern 233 and the fourth control pattern 234, which are substantially symmetrical to each other with respect to the center line CL, may be respectively disposed on the first and second side surfaces 225 and 226 of the light guide bar 220, as shown in FIG. 8.

Hereinafter, the light exiting through the third control pattern 233 will be referred to as a left light, and the light exiting through the fourth control pattern 234 will be referred to as a right light. The exit angle of the left light is controlled by the third control pattern 233 and the exit angle of the right light is controlled by the fourth control pattern 234. Since the third and fourth control patterns 233 and 234 are substantially symmetrical to each other with respect to the center line CL, a light exit distribution of the left light may be substantially symmetrical to a light exit distribution of the right light with reference to the center line CL.

In FIG. 10, an x-axis represents the exit angle against the center line CL and a y-axis represents the brightness in accordance with the exit angle. A third graph G3 represents the brightness according to the exit angle of the left light, and a fourth graph G4 represents the brightness according to the exit angle of the right light.

The exit angle is defined by the center line CL crossing the center portion of the light guide bar 220 and the left and right lights. As described above, in an exemplary embodiment where the third and fourth control patterns 233 and 234 have the same shape and density, the left light has a profile similar to a profile of the right light.

As shown in FIG. 10, the left light has a peak brightness P3 at the exit angle of about −85 degrees, and the right light has a peak brightness P4 at the exit angle of about +85 degrees.

When the brightness is measured in an exemplary embodiment where the exit pattern is not disposed on the upper surface 224 of the light guide bar 220, the brightness is substantially zero in the exit angle of about zero (0) to about ±45 degrees, and the brightness is equal to or less than about $1/12$ of the peak brightnesses P3 and P4 in the exit angle of about −60 degrees to about +60 degrees.

As described above, in an exemplary embodiment, the exit angles of the left and right lights may be controlled by using the third and fourth control patterns 233 and 234 respectively disposed on the first and second side surfaces 225 and 226 of the light guide bar 220. In such an embodiment, the third control patterns 233 may control the left light such that the peak brightness P3 of the left light is located between the center line CL and the exit angle of about −80 degrees to about −90 degrees, and the fourth control patterns 234 may control the right light such that the peak brightness P4 of the right light is located between the center line CL and the exit angle of about +80 degrees to about +90 degrees.

The peak brightnesses P3 and P4 in an exemplary embodiment of the light guide bar 220 including the third and fourth control patterns 233 and 234 having the prism shape are higher than the peak brightnesses P1 and P2 in an exemplary embodiment of the light guide bar 220 including the first and second control patterns 231 and 232 having the lenticular lens shape. The range, in which the brightness is substantially zero, in the light guide bar 220 shown in FIG. 7, i.e., −45 degrees to +45 degrees, becomes wider than the range, in which the brightness is substantially zero, in the light guide bar 220 shown in FIG. 2, i.e., −20 degrees to +20 degrees.

Figure 11:
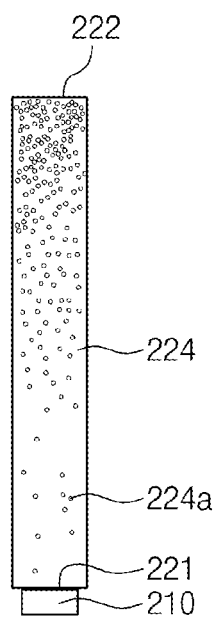
FIG. 11 is a plan view showing an upper surface of the light guide bar shown in FIG. 2.
Figure 12:
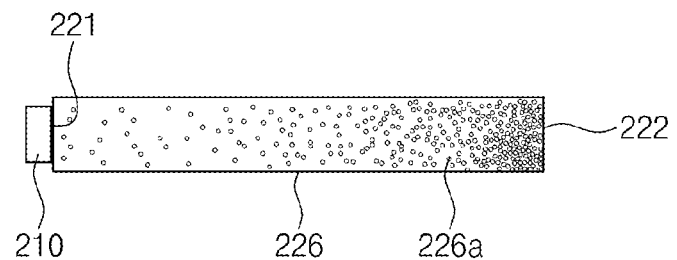
FIG. 12 is a side view showing a side surface of the light guide bar shown in FIG. 2.

FIG. 11 is a plan view showing the upper surface of the light guide bar shown in FIG. 2, and FIG. 12 is a side view showing the side surface of the light guide bar shown in FIG. 2.

Referring to FIG. 11, in an exemplary embodiment, an upper exit pattern 224a is disposed on the upper surface 224 of the light guide bar 220 to allow the first light to travel in the upward direction of the upper surface 224 of the light guide bar 220. In such an embodiment, the brightness may be changed in the exit angle from about zero (0) degrees to about ±45 degrees according to the density of the upper exit pattern 224a. In such an embodiment, when the density of the upper exit pattern 224a increases, the brightness becomes higher in the exit angle from about zero (0) degrees to about ±45 degrees, and when the density of the upper exit pattern 224a decreases, the brightness becomes lower in the exit angle from about zero (0) degrees to about ±45 degrees. Therefore, when the brightness in exit angle from about zero (0) degrees to about ±45 degrees is set or predetermined, the density of the upper exit pattern 224a may be controlled based on the set brightness.

In such an embodiment, the density of the upper exit pattern 224a is changed depending on a distance from the light source 210. If the density of the upper exit pattern 224a is constant regardless of the distance from the light source 210, the brightness of the incident surface 221 at which the light source 210 is located is too high and the brightness of the opposite surface 222 at which the light source 210 is not located is too low, such that uniform brightness may not be achieved. In an exemplary embodiment, the upper exit pattern 224a is disposed on the upper surface 224 of the light guide bar 220 in a predetermined pattern where the density of the upper exit pattern 224a becomes high as the distance from the light source 210 is increased, a difference in brightness between the incident surface 221 and the opposite surface 222 may be reduced, thereby improving the uniformity of the brightness.

Referring to FIG. 12, a first exit pattern (not shown) is disposed on the first surface 225 of the light guide bar 220 to allow the first light to travel in the left direction of the light guide bar 220, and a second exit pattern 226a is disposed on the second surface 226 of the light guide bar 220 to allow the first light to travel in the right direction of the light guide bar 220. In such an embodiment, although only the second exit pattern 226a is shown in FIG. 12, the first exit pattern has substantially the same structure and function as the second exit pattern 226a.

The density of the second exit pattern 226a is changed depending on the distance from the light source 210. If the density of the second exit pattern 226a is set to be constant regardless of the distance from the light source 210, the brightness of the incident surface 221 at which the light source 210 is located is too high and the brightness of the opposite surface 222 at which the light source 210 is not located is too low, such that uniform brightness may not be achieved. In an exemplary embodiment, the second exit pattern 226a is disposed on the second side surface 226 of the light guide bar 220 in a predetermined pattern where the density of the second exit pattern 226a becomes high as the distance from the light source 210 is increased, the difference in brightness between the incident surface 221 and the opposite surface 222 may be reduced, thereby improving the uniformity of the brightness.

In such an embodiment, the first exit pattern (not shown) and the second exit pattern 226a may have the density higher than the density of the upper exit pattern 224a such that a light exit efficiency of the first and second side surfaces 225 and 226 may be greater than a light exit efficiency of the upper surface.

Figure 13A:
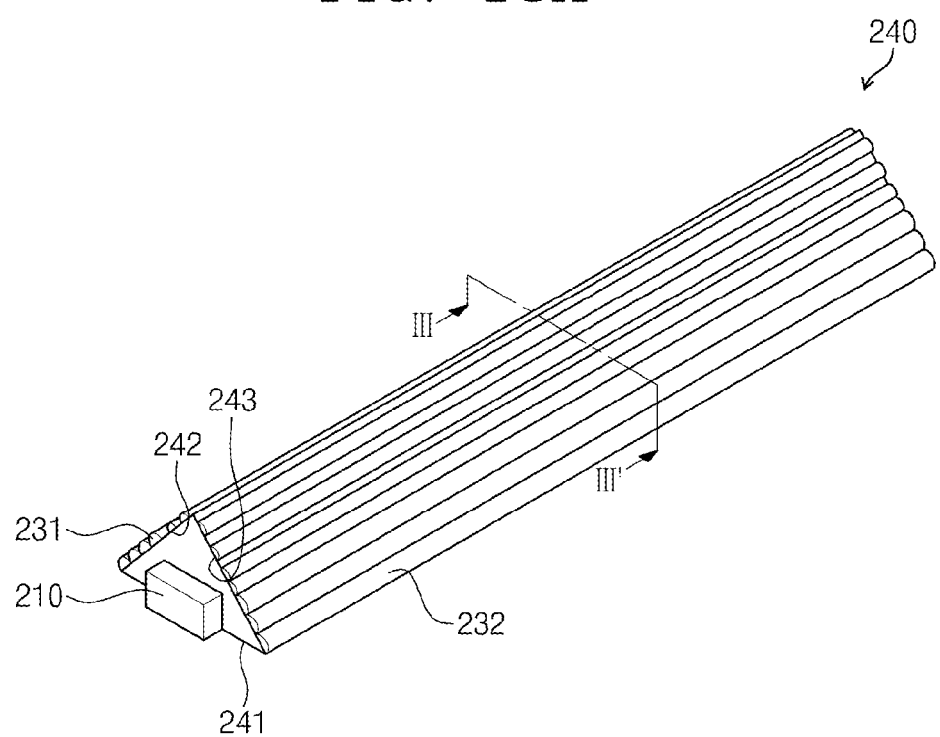
FIG. 13A is a perspective view of another alternative exemplary embodiment of a light guide bar according to the invention.
Figure 13B:
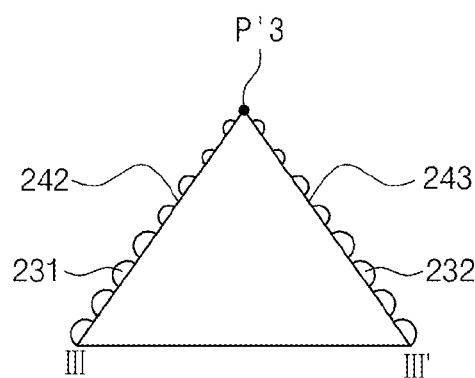
FIG. 13B is a cross-sectional view taken along line III-III' of the light guide bar shown in FIG. 13A.

FIG. 13A is a perspective view showing an alternative exemplary embodiment of a light guide bar according to the invention, and FIG. 13B is a cross-sectional view taken along line III-III' of the light guide bar shown in FIG. 13A.

Referring to FIGS. 13A and 13B, an exemplary embodiment, a light guide bar 240 may have a triangular prism shape. The light guide bar 240 includes a bottom surface 241, and first and second surfaces 242 and 243 extending from both ends of the bottom surface 241 and being engaged with each other. A corner formed by the first and second surfaces 242 and 243 that meet with each other is referred to as a pitch (or peak) P'3.

The bottom surface 241 is in contact with the bottom portion 251 (refer to FIG. 1) of the bottom chassis 250, and first and second control patterns 231 and 232 are respectively disposed on the first and second side surfaces 242 and 243.

In one exemplary embodiment, for example, each of the first and second control patterns 231 and 232 includes a plurality of lenticular lenses or a plurality of prisms.

In an exemplary embodiment, the density of the first and second control patterns 231 and 232 may be changed as the first and second control patterns 231 and 232 are closer to the pitch P'3 from the bottom surface 241. In one exemplary embodiment, for example, the density of the first and second control patterns 231 and 232 is relatively high in the area adjacent to the bottom surface 241 and is relatively low in the area adjacent to the pitch P'3, but it is not limited thereto or thereby. In an alternative exemplary embodiment, the density of the first and second control patterns 231 and 232 may be relatively low in the area adjacent to the bottom surface 241 and may be relatively high in the area adjacent to the pitch P'3, or the first and second control patterns 231 and 232 may have highest density in the center area of each of the first and second side surfaces 242 and 243.

In such an embodiment, the density of the first and second control patterns 231 and 232 may be controlled by a size or number of the lenticular lenses. In FIGS. 13A and 13B, the size of the lenticular lenses increases as the lenticular lenses are closer to the bottom surface 241 from the pitch P'3. In an alternative exemplary embodiment, the lenticular lenses may have a same size as each other, and a distance between the lenticular lenses may become small as the lenticular lenses are closer to the bottom surface 241 from the pitch P'3, or the height of the lenticular lenses may become great as the lenticular lenses are closer to the bottom surface 241 from the pitch P'3 to control the density of the first and second control patterns 231 and 232.

As described above, in an exemplary embodiment, the density or size of the first and second control patterns 231 and 232 is controlled based on a position thereof in the first and second side surfaces 242 and 243, such that the amount of the light traveling to the front or side portion of the light guide bar 240 may be controlled.

Figure 14A:
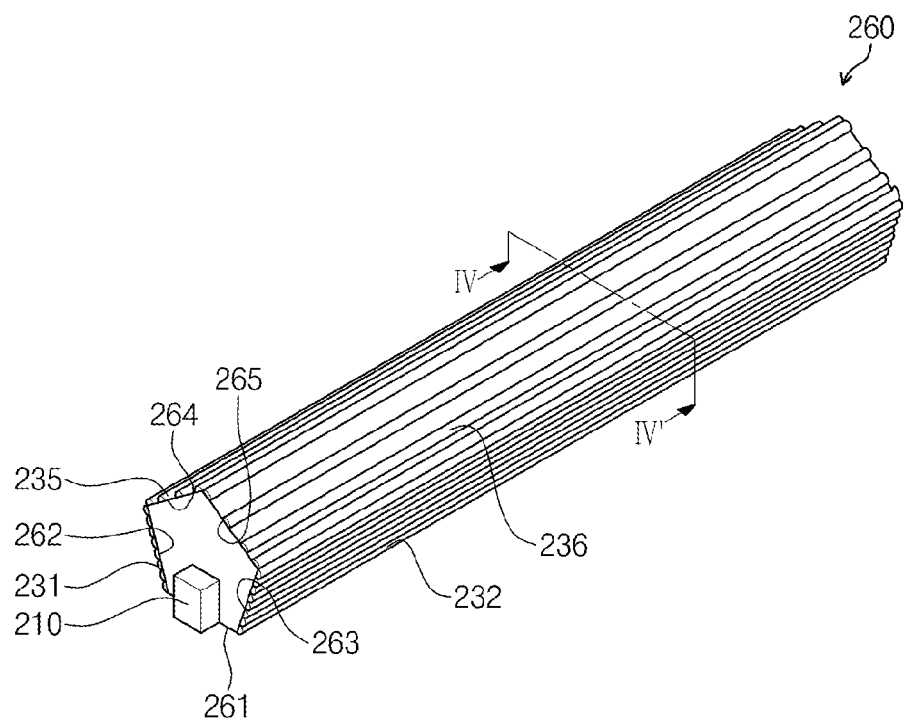
FIG. 14A is a perspective view of another alternative exemplary embodiment of a light guide bar according to the invention.
Figure 14B:
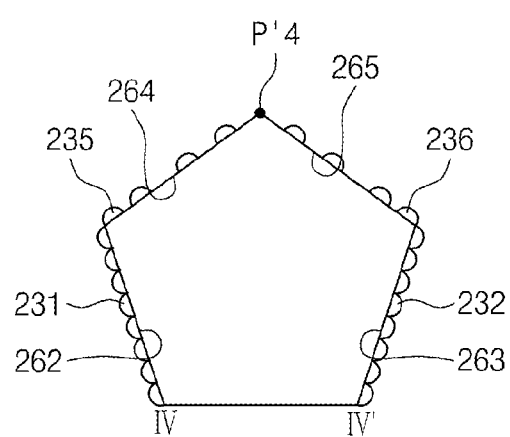
FIG. 14B is a cross-sectional view taken along line IV-IV' of the light guide bar shown in FIG. 14A.

FIG. 14A is a perspective view showing another alternative exemplary embodiment of a light guide bar according to the invention, and FIG. 14B is a cross-sectional view taken along line IV-IV' of the light guide bar shown in FIG. 14A.

Referring to FIGS. 14A and 14B, an exemplary embodiment of a light guide bar 260 may have a pentagonal prism shape. The light guide bar 260 includes a bottom surface 261, first and second lower surfaces 262 and 263 respectively extending from both ends of the bottom surface 261, a first upper surface 264 extending from the first lower surface 262, and a second upper surface 265 extending from the second lower surface 263 and being engaged with the first upper surface 264. A corner formed by the first and second upper surfaces 264 and 265 that meet with each other is referred to as a pitch P'4.

First and second control patterns 231 and 232 are respectively disposed on the first and second lower surfaces 262 and 263, and third and fourth control patterns 235 and 236 are respectively disposed on the first and second upper surfaces 264 and 265.

Each of the first, second, third and fourth control patterns 231, 232, 235 and 236 includes a plurality of lenticular lenses or a plurality of prisms, and as shown in FIGS. 14A and 14B, each of the first, second, third and fourth control patterns 231, 232, 235, and 236 may include the lenticular lenses.

When the first and second control patterns 231 and 232 are disposed or defined on the first and second lower surfaces 262 and 263 in a first density, the third and fourth control patterns 235 and 236 are disposed or defined on the first and second upper surfaces 264 and 265 in a second density different from the first density.

In an exemplary embodiment, as shown in FIGS. 14A and 14B, each of the first, second, third and fourth control patterns 231, 232, 235 and 236 includes the lenticular lenses having the same size and shape, but the distance between the lenticular lenses becomes different in each control pattern 231, 232, 235 and 236 to control the density of the first, second, third and fourth control patterns 231, 232, 235, and 236.

As described above, in an exemplary embodiment, the density of the control patterns 231, 232, 235 and 236 disposed on the first and second lower surfaces 262 and 263 and the first and second upper surfaces 264 and 265 is controlled, such that the amount of the light traveling to the front or side portion of the light guide bar 240 may be controlled.

Figure 15A:
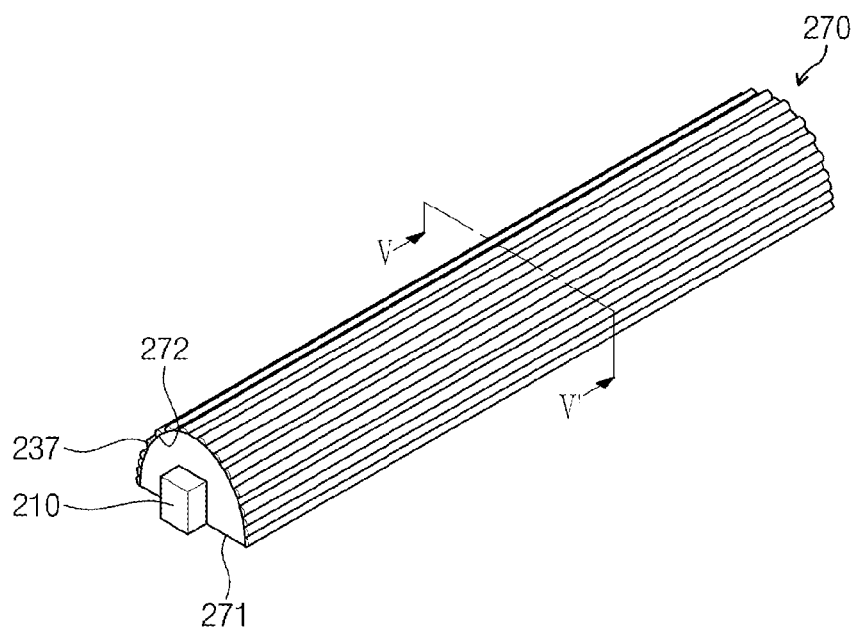
FIG. 15A is a perspective view of another alternative exemplary embodiment of a light guide bar according to the invention.
Figure 15B:
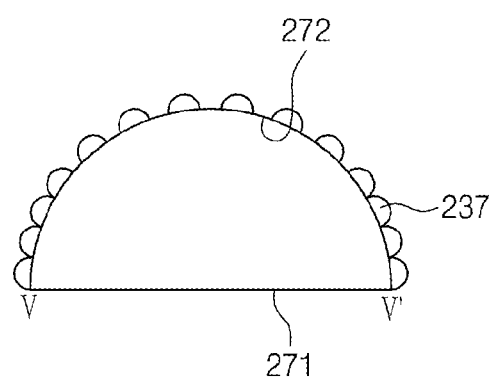
FIG. 15B is a cross-sectional view taken along a line V-V' of the light guide bar shown in FIG. 15A.

FIG. 15A is a perspective view showing another alternative exemplary embodiment of a light guide bar according to the invention, and FIG. 15B is a cross-sectional view taken along a line V-V of the light guide bar shown in FIG. 15A.

Referring to FIGS. 15A and 15B, an exemplary embodiment of a light guide bar 270 may have a semi-cylinder shape. The light guide bar 270 includes a bottom surface 271 and a curved surface 272 curved in a semi-circular shape with respect to the bottom surface 271. A control pattern 237 is disposed or defined on the curved surface 272. The control pattern 237 includes a plurality of lenticular lenses or a plurality of prisms. In one exemplary embodiment, as shown in FIGS. 15A and 15B, the control pattern 237 may include the lenticular lenses.

The density of the control pattern 237 is decreased as the control pattern 237 is closer to a pitch of the curved surface 272, i.e., a position having a largest straight-line distance from the bottom surface 271. In such an embodiment, the amount of the light traveling to the front portion of the light guide bar 270 is decreased as the density of the control pattern 237 is decreased. In such an embodiment, the amount of the light traveling to the side portion of the light guide bar 270 is increased as the amount of the light traveling to the front portion of the light guide bar 270 is decreased, thereby improving the uniformity in brightness.

Figure 16:
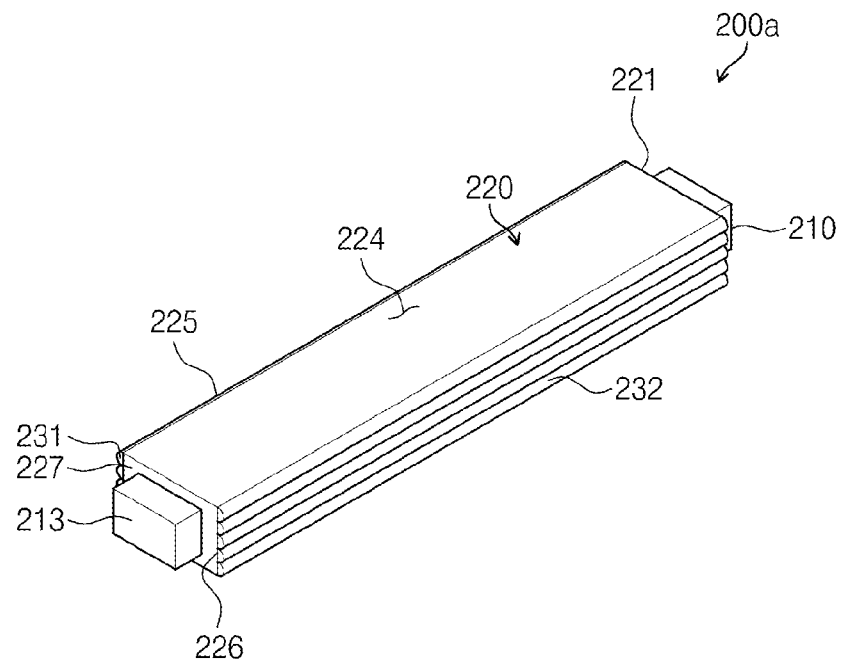
FIG. 16 is a perspective view of another alternative exemplary embodiment of a backlight unit according to the invention.

FIG. 16 is a perspective view of an alternative exemplary embodiment of a backlight unit according to the invention.

Referring to FIG. 16, an exemplary embodiment of a backlight unit 200a includes a first light source 210, a second light source 213 and a light guide bar 220. The light guide bar 220 has a bar shape elongated in one direction, the first light source 210 is disposed at a position adjacent to one end of the light guide bar 220, and the second light source 213 is disposed at a position adjacent to the other end of the light guide bar 220.

The light guide bar 220 includes a first incident surface 221 disposed at the one end thereof to receive the light emitted from the first light source 210 and a second incident surface 227 disposed at the other end thereof to receive the light emitted from the second light source 213.

The light guide bar 220 receives the lights emitted from the first and second light sources 210 and 213 respectively through the first and second incident surfaces 221 and 227 and guides the received lights to a longitudinal direction thereof.

In an exemplary embodiment, first and second control patterns 231 and 232 are respectively disposed on first and second side surfaces 225 and 226 of the light guide bar 220, and the guided lights exit through the first and second control patterns 231 and 232 to the outside of the light guide bar 220.

As described above, in such an embodiment, the first and second light sources 210 and 213 are disposed at both ends of the light guide bar 220, respectively, such that the total brightness of the backlight unit 200a may be enhanced.

Figure 17:
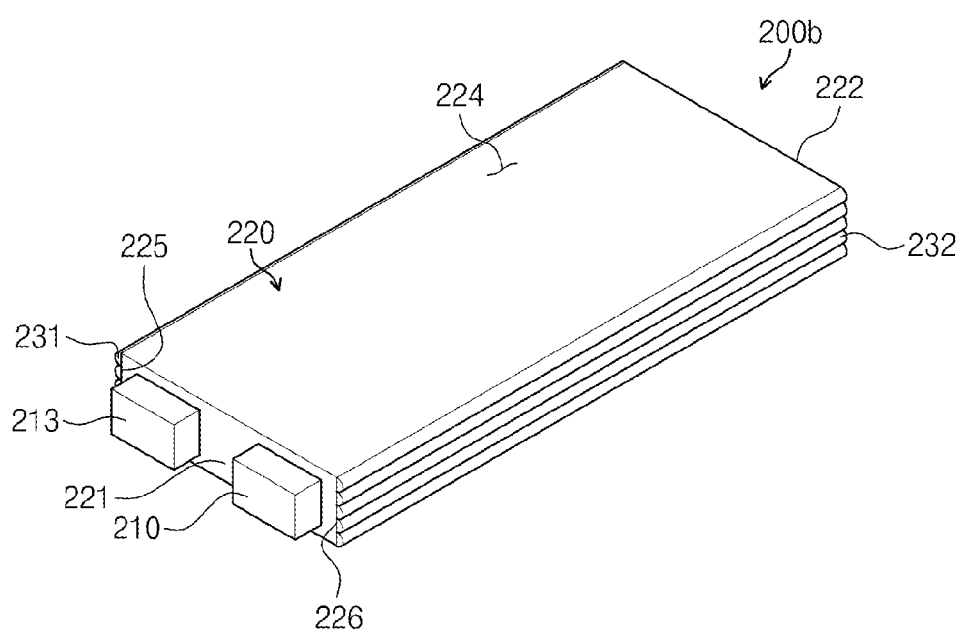
FIG. 17 is a perspective view showing of another alternative exemplary embodiment of a backlight unit according to the invention.

FIG. 17 is a perspective view of another alternative exemplary embodiment of a backlight unit according to the invention.

Referring to FIG. 17, an exemplary embodiment of a backlight unit 200b includes a first light source 210, a second light source 213 and a light guide bar 220. The light guide bar 220 has a bar shape elongated in one direction, and the first and second light sources 210 and 213 are disposed at positions adjacent to one end of the light guide bar 220.

The light guide bar 220 includes an incident surface 221 to receive the lights emitted from the first and second light sources 210 and 213. As described above, in such an embodiment, the number of the light sources disposed on the incident surface 221 increases, and a width of the incident surface, i.e., a width of the light guide bar 220, increases.

The light guide bar 220 receives the lights emitted from the first and second light sources 210 and 213 through the incident surface 221, and guides the received lights to a longitudinal direction thereof.

Figure 18:
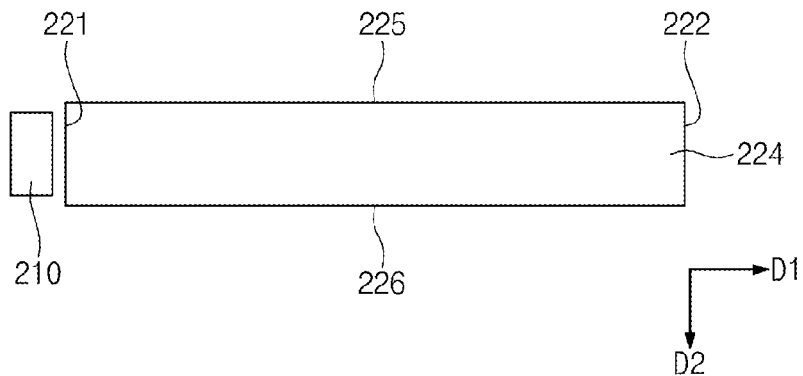
FIG. 18 is a plan view showing an upper surface of an exemplary embodiment of a light guide bar.

FIG. 18 is a plan view showing an upper surface of an exemplary embodiment of a light guide bar.

Referring to FIG. 18, in an exemplary embodiment, the light source 210 is disposed at the position adjacent to the one end of the light guide bar 220. The upper surface 224 of the light guide bar 220 may have a rectangular shape elongated in the first direction D1. In such an embodiment, a width in the second direction D2 of the upper surface 224 is constant. Accordingly, the width of the incident surface 221 of the light guide bar 220 may be substantially the same as the width of the opposite surface of the light guide bar 220.

Figure 19:
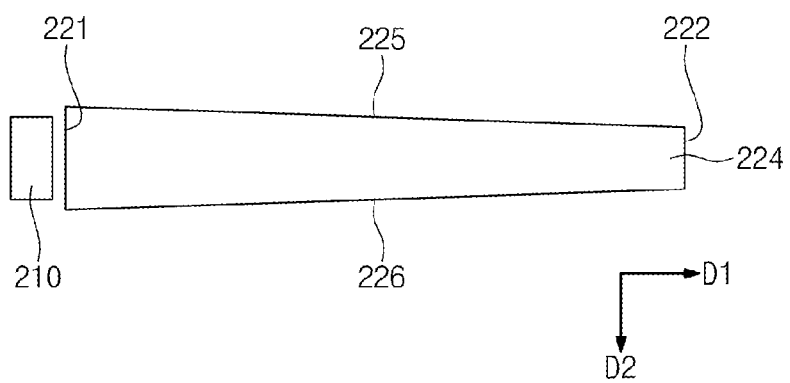
FIG. 19 is a plan view showing an upper surface of an alternative exemplary embodiment of a light guide bar according to the invention.

FIG. 19 is a plan view showing an upper surface of an alternative exemplary embodiment of a light guide bar according to the invention.

Referring to FIG. 19, in an exemplary embodiment, an upper surface of a light guide bar 220 has a width in the second direction D2, which is uniformly or continuously decreased along the first direction D1. The light source 210 is disposed at a position adjacent to the one end of the light guide bar 220, and the width in the second direction D2 of the upper surface 224 is decreased as it is farther from the light source 210. Thus, the width of the incident surface 221 of the light guide bar 220 is greater than the width of the opposite surface 222 of the light guide bar 220.

In such an embodiment, the first and second surfaces 225 and 226 are inclined to be converged on a virtual point located outside the light guide bar 220. As described above, when the distance between the first and second side surfaces 225 and 226 becomes small as the first and second side surfaces 225 and 226 are farther from the light source 210, the brightness in the area adjacent to the opposite surface may be effectively prevented from lowered, which is farther from the light source 210. Accordingly, in such an embodiment, the difference in brightness between the area adjacent to the incident surface and the area adjacent to the opposite surface may be reduced.

Figure 20:
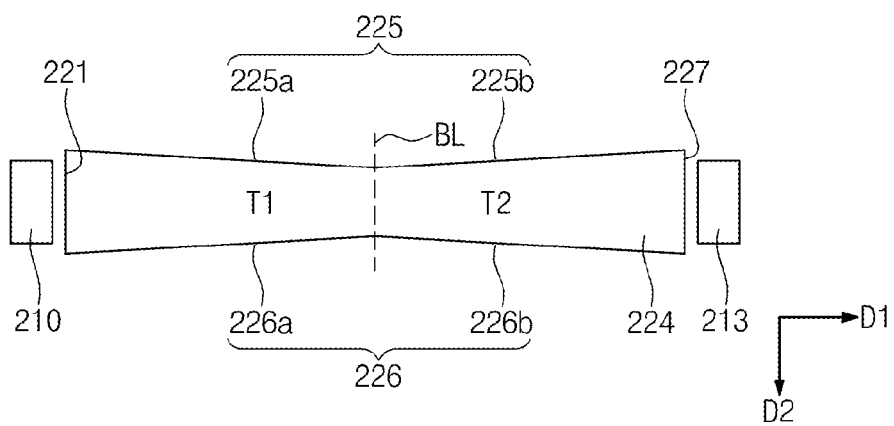
FIG. 20 is a plan view showing an upper surface of another alternative exemplary embodiment of a light guide bar according to the invention.

FIG. 20 is a plan view showing an upper surface of another alternative exemplary embodiment of a light guide bar according to the invention.

Referring to FIG. 20, in an exemplary embodiment, the first light source 210 is disposed at the position adjacent to the one end of the light guide bar 220, and the second light source 213 is disposed at the position adjacent to the other end of the light guide bar 220. The upper surface 224 of the light guide bar 220 is divided into first and second areas T1 and T2 with reference to a boundary line BL, e.g., an imaginary line in the second direction D2 at a center of the light guide bar 220. A width in the second direction D2 of the upper surface 224 is decreased as it is farther from the first light source 210 in the first area T1, and a width in the second direction D2 of the upper surface 224 is decreased as it is farther from the second light source 213 in the second area T2.

In such an embodiment, the first side surface 225 includes a first sub-side surface 225a inclined to the second surface 226 in the first area T1 and a second sub-side surface 225b inclined to the second surface 226 in the second area T2. The second side surface 226 includes a third sub-side surface 226a inclined to the first surface 225 in the first area T1 and a fourth sub-side surface 226b inclined to the first surface 225 in the second area T2.

The first and third sub-side surfaces 225a and 226a are inclined to be converged on a virtual point located at a right side with respect to the boundary line BL, and the second and fourth sub-side surfaces 225b and 226b are inclined to be converged on a virtual point located at a left side with respect to the boundary line BL. As described above, in such an embodiment, when the first and second light sources 210 and 213 are respectively disposed at both ends of the light guide bar 220, the brightness in the center portion of the light guide bar 220 may be effectively prevented from being lowered compared to the brightness of the areas adjacent to the first and second incident surfaces, such that the difference in brightness between the center portion and the first and second incident surfaces may be reduced.

Figure 21A:
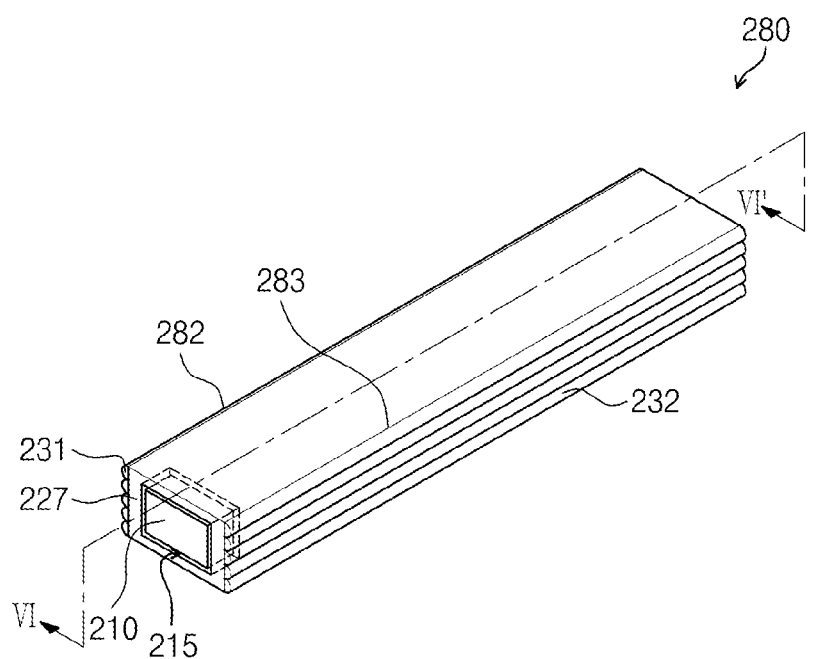
FIG. 21A is a perspective view of an alternative exemplary embodiment of a light source and a light guide bar according to the invention.
Figure 21B:
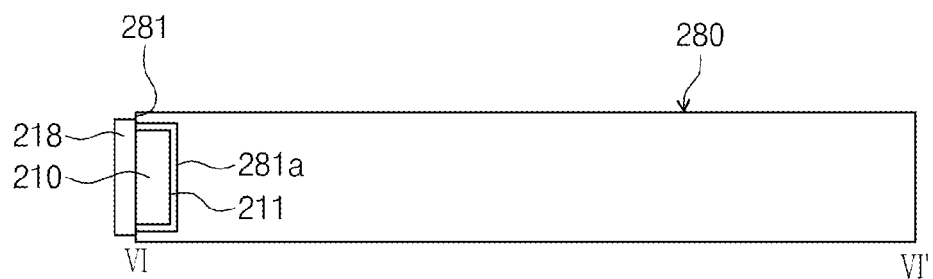
FIG. 21B is a cross-sectional view taken along line VI-VI' shown in FIG. 21A.

FIG. 21A is a perspective view showing an alternative exemplary embodiment of a light source and a light guide bar according to the invention, and FIG. 21B is a cross-sectional view taken along line VI-VI' shown in FIG. 21A.

Referring to FIGS. 21A and 21B, in an exemplary embodiment, a light guide bar 280 includes a light source-receiving recess 215 defined or formed at one side surface 281 thereof. The light source-receiving recess 215 may be provided or formed by recessing a portion of the side surface 281, and the light source 210 is accommodated in the light source-receiving recess 215. Accordingly, an incident surface 281a, to which the light emitted from the light source 210 is incident, corresponds to a surface that faces a light emitting surface 211 of the light source 210 among surfaces that define the light source-receiving recess 215. In such an embodiment, the incident surface 281a may be disposed inside the light guide bar 280.

First and second control patterns 231 and 232 are respectively disposed on the first and second side surfaces 282 and 283 of the light guide bar 280. The first and second control patterns 231 and 232 are substantially the same as the first and second control patterns in the exemplary embodiments described above, and any repetitive detailed description thereof will be omitted.

As shown in FIG. 21B, the light source 210 is disposed or mounted on a base substrate 218, e.g., a printed circuit board or a flexible circuit film. The base substrate 218, on which the light source 210 is mounted, may be attached and fixed to the side surface 281 at which the light source-receiving recess 215 is formed.

In such an embodiment, when the light guide bar 280 is contracted or expanded by heat, the light source 210 may move together with the light guide bar 280, and thus a gap between the light source 210 and the incident surface 281a may be effectively prevented from being deformed by the contraction or expansion of the light guide bar 280.

In such an embodiment, a depth of the light source-receiving recess 215 is controlled to allow the light emitting surface 211 of the light source 210 to be substantially adjacent to, e.g., attached to, the incident surface 281a, such that a leakage of the light emitted from the light source 210 may be minimized.

Figure 22A:
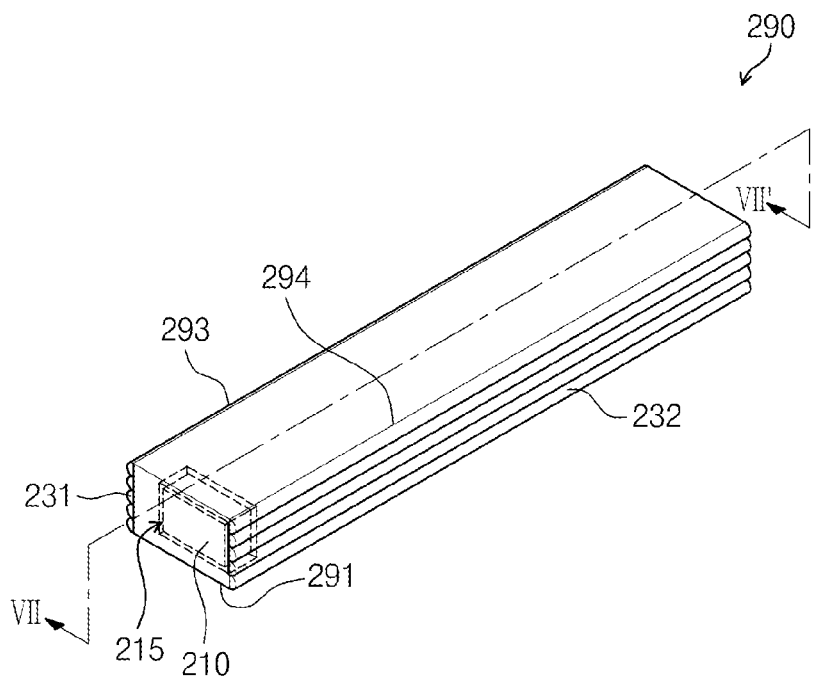
FIG. 22A is a perspective view of another alternative exemplary embodiment of a light source and a light guide bar according to the invention.
Figure 22B:
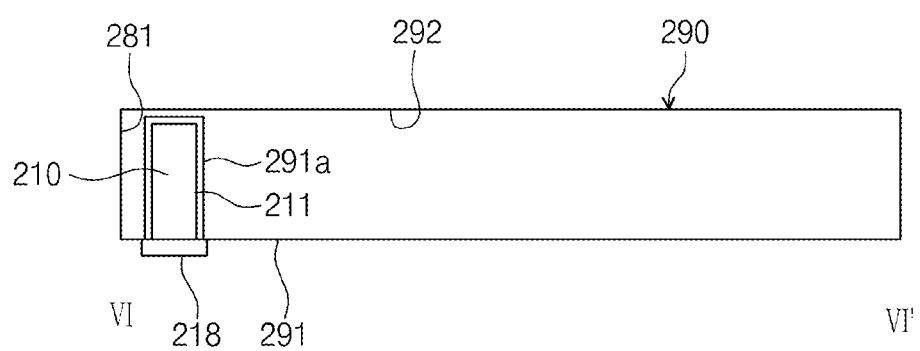
FIG. 22B is a cross-sectional view taken along line VII-VII' shown in FIG. 22A.

FIG. 22A is a perspective view showing an alternative exemplary embodiment of a light source and a light guide bar according to the invention, and FIG. 22B is a cross-sectional view taken along line VII-VII' shown in FIG. 22A.

Referring to FIGS. 22A and 22B, in an exemplary embodiment, a light guide bar 290 includes a bottom surface 291 and a light source-receiving recess 215. The light source-receiving recess 215 is defined or formed by recessing a portion of the bottom surface 291 toward an upper surface 292 of the light guide bar 290. Accordingly, an incident surface 291a, to which the light emitted from the light source 210 is incident, corresponds to a surface that faces a light emitting surface 211 of the light source 210 among surfaces that define the light source-receiving recess 215. Therefore, in such an embodiment, the incident surface 291a may be disposed inside the light guide bar 290.

First and second control patterns 231 and 232 are respectively disposed on the first and second side surfaces 293 and 294 of the light guide bar 290. The first and second control patterns 231 and 232 are substantially the same as the first and second control patterns in the exemplary embodiments described above, and any repetitive detailed description thereof will be omitted.

In an exemplary embodiment, as shown in FIG. 22B, the light source 210 is disposed or mounted on a base substrate 218, e.g., a printed circuit board or a flexible circuit film. The base substrate 218, on which the light source 210 is mounted, may be attached and fixed to the side surface 291 at which the light source-receiving recess 215 is formed.

Thus, in such an embodiment, when the light guide bar 290 is contracted or expanded by heat, the light source 210 may move together with the light guide bar 290, and thus a gap between the light source 210 and the incident surface 291a may be effectively prevented from being deformed by the contraction or expansion of the light guide bar 290.

In an exemplary embodiment, as shown in FIGS. 22A and 22B, the light source-receiving recess 215 is recessed from the bottom surface 291 to the upper surface 292. In an alternative exemplary embodiment, the light source-receiving recess 215 may be formed by a portion of the upper surface 292 toward the bottom surface 291. In such an embodiment, the base substrate 218 on which the light source 210 is mounted may be fixed to the upper surface 292.

Figure 23:
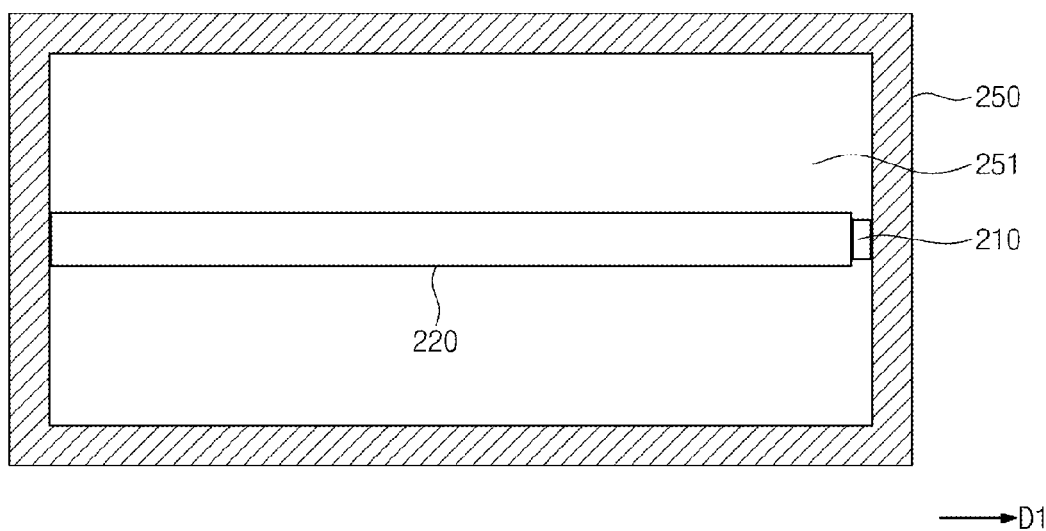
FIG. 23 is a plan view showing the backlight unit shown in FIG. 1.

FIG. 23 is a plan view showing the backlight unit shown in FIG. 1.

Referring to FIG. 23, the light source 210 and the light guide bar 220 are disposed on the bottom portion 251 of the bottom chassis 250. When viewed in a plan view, the bottom chassis 250 has the rectangular shape extending in the first direction D1, and the light guide bar 220 extends in the first direction D1.

The light guide bar 220 is disposed along the first direction D1 at a center portion of the bottom portion 251, and the bottom portion 251 is thereby divided into two portions, and the light source 210 is fixed to an inner sidewall of the bottom chassis 250 or the bottom portion 251 after being mounted on a support film (not shown). In an exemplary embodiment, the light guide bar 220 may be fixed to the bottom portion 251 of the bottom chassis 250 by a clip (not shown) or a separate adhesive member (not shown).

Figure 24:
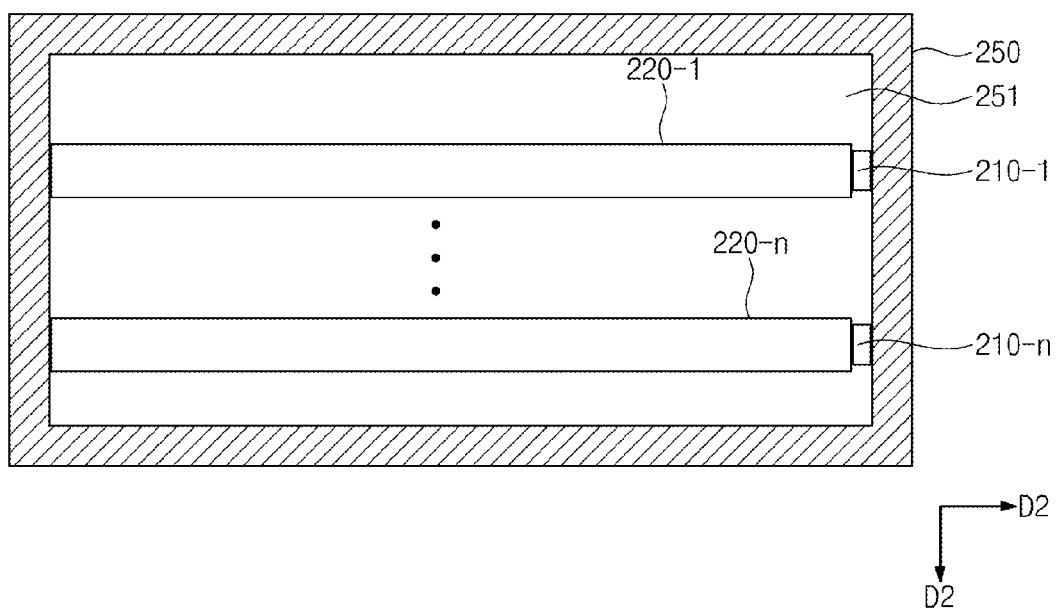
FIG. 24 is a plan view of another alternative exemplary embodiment of a backlight unit according to the invention.

FIG. 24 is a plan view showing an alternative exemplary embodiment of a backlight unit according to the invention.

Referring to FIG. 24, an exemplary embodiment of a backlight unit may include a plurality of light guide bars 220-1 to 220-n. The light guide bars 220-1 to 220-n extend substantially in the first direction D1 and are arranged substantially in the second direction D2 perpendicular to the first direction D1 to be substantially parallel to each other.

In such an embodiment, the backlight unit includes a plurality of light sources 210-1 to 210-n. The light sources 210-1 to 210-n are arranged in the second direction D2 and spaced apart from each other at regular or constant intervals. Each of the light sources 210-1 to 210-n faces an incident surface of a corresponding light guide bar of the light guide bars 220-1 to 220-n.

The number of the light guide bars 220-1 to 220-n and the number of the light sources 210-1 to 210-n of the backlight unit may be changed based on a predetermined amount of the light to be used.

Figure 25:
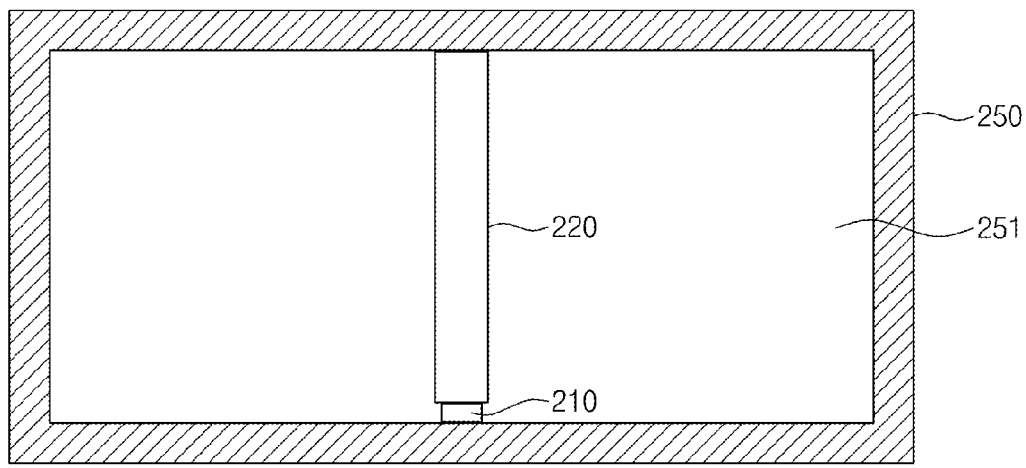
FIG. 25 is a plan view of another alternative exemplary embodiment of a backlight unit according to the invention.

FIG. 25 is a plan view showing another alternative exemplary embodiment of a backlight unit according to the invention.

Referring to FIG. 25, in an exemplary embodiment, a light source 210 and a light guide bar 220 are accommodated on the bottom portion 251 of the bottom chassis 250. When viewed in a plan view, the light guide bar 220 has a bar shape extending substantially in the second direction D1 perpendicular to the first direction D1 when the bottom chassis 250 has a rectangular shape extending substantially in the first direction D1.

The light guide bar 220 is disposed along the second direction D2 at a center portion of the bottom portion 251, the bottom portion 251 is thereby divided into two portions, and the light source 210 is fixed to an inner sidewall of the bottom chassis 250 or the bottom portion 251 after being mounted on a support film (not shown). In an exemplary embodiment, the light guide bar 220 may be fixed to the bottom portion 251 of the bottom chassis 250 by a clip (not shown) or a separate adhesive member (not shown).

Figure 26:
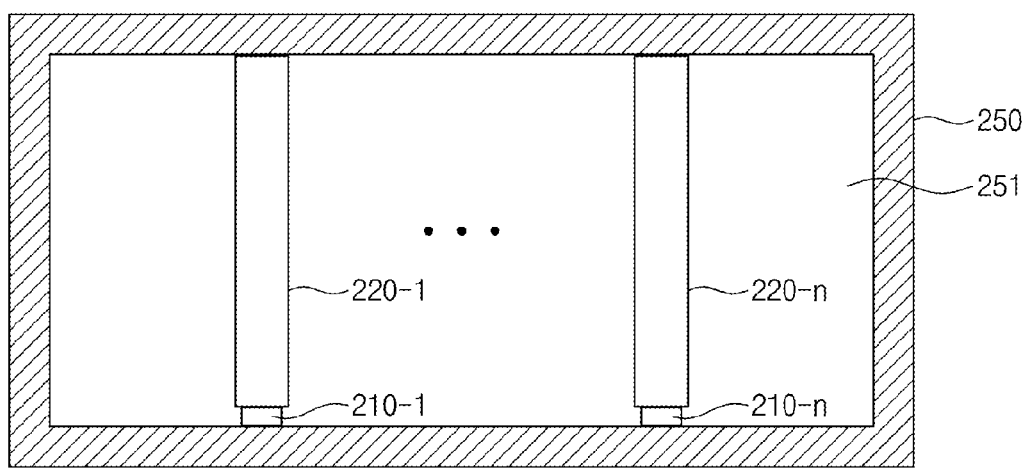
FIG. 26 is a plan view of another alternative exemplary embodiment of a backlight unit according to the invention.

FIG. 26 is a plan view showing another alternative exemplary embodiment of a backlight unit according to the invention.

Referring to FIG. 26, in an exemplary embodiment, a backlight unit may include a plurality of light guide bars 220-1 to 220-n. The light guide bars 220-1 to 220-n extend substantially in the second direction D2 and are arranged substantially in the first direction D1 to be substantially parallel to each other.

In such an embodiment, the backlight unit includes a plurality of light sources 210-1 to 210-n. The light sources 210-1 to 210-n are arranged substantially in the first direction D1 and spaced apart from each other at regular or constant intervals. Each of the light sources 210-1 to 210-n faces an incident surface of a corresponding light guide bar of the light guide bars 220-1 to 220-n.

The number of the light guide bars 220-1 to 220-n and the number of the light sources 210-1 to 210-n of the backlight unit may be changed based on a predetermined amount of the light to be used.

Figure 27:
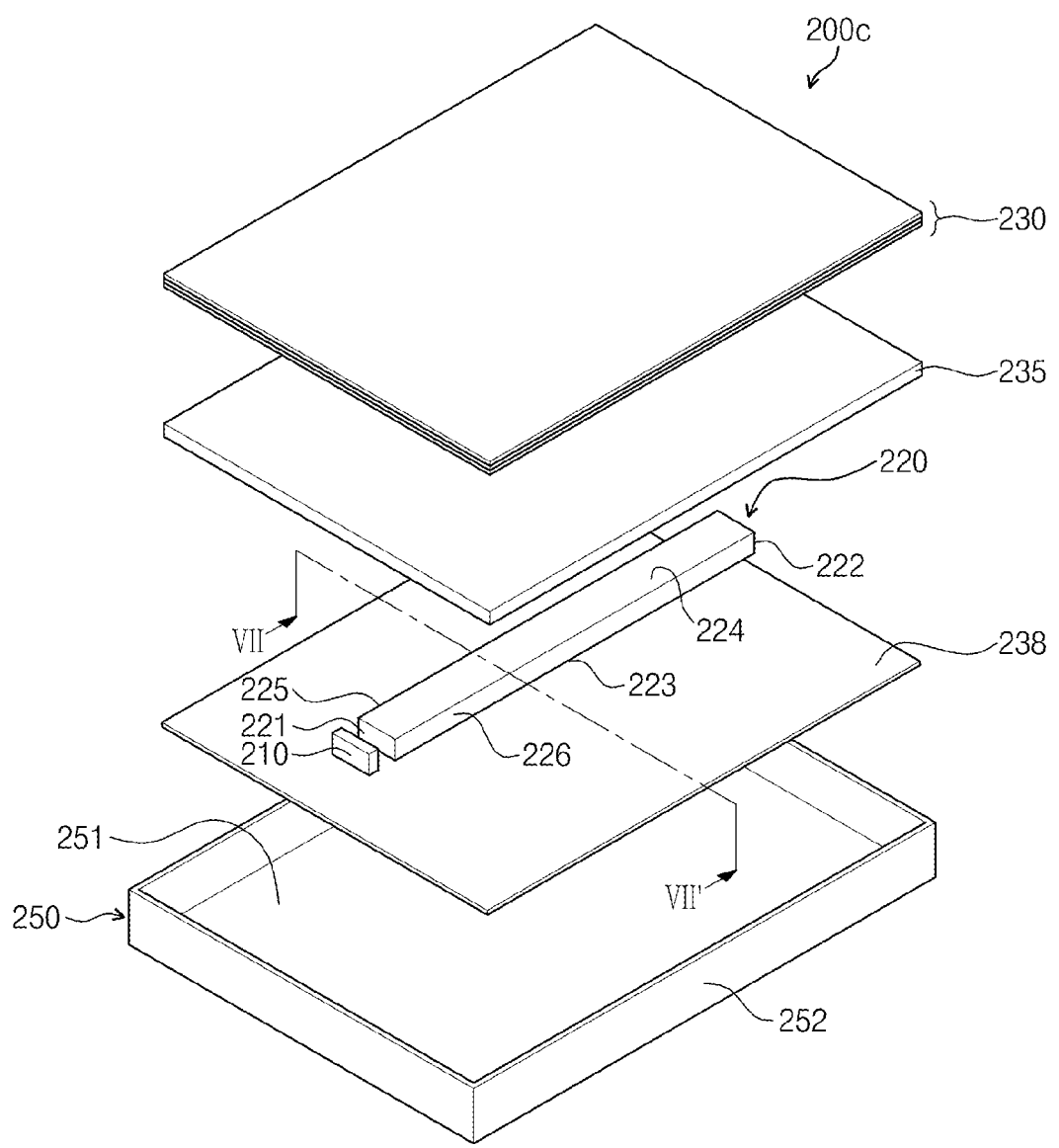
FIG. 27 is an exploded perspective view of another alternative exemplary embodiment of a backlight unit according to the invention.

FIG. 27 is an exploded perspective view showing a backlight unit according to another exemplary embodiment of the invention.

The backlight unit in FIG. 27 is substantially the same as the backlight unit shown in FIG. 1 except for a diffusion plate and a reflection sheet. The same or like elements shown in FIG. 27 have been labeled with the same reference characters as used above to describe the exemplary embodiments of the backlight unit shown in FIG. 1, and any repetitive detailed description thereof will hereinafter be omitted or simplified.

Referring to FIG. 27, in an exemplary embodiment, a backlight unit 200c may further include a diffusion plate 235 and a reflection sheet 238.

The diffusion plate 235 is interposed between the light guide bar 220 and the optical sheet 230 to compensate the brightness difference between the center portion of the light guide bar 220 and the side portions of the backlight unit 200c in which the light guide bar 220 is not disposed. In such an embodiment, a flatter (not shown) may be disposed between the light guide bar 220 and the optical sheet 230 along with the diffusion plate 235, or the diffusion plate 235 may be replaced with the flatter.

The reflection sheet 238 is disposed on the bottom portion 251 of the bottom chassis 250, and the light guide bar 220 is disposed on the reflection sheet 238. The reflection sheet 238 reflects the light emitted from the light guide bar 220.

Figure 28:
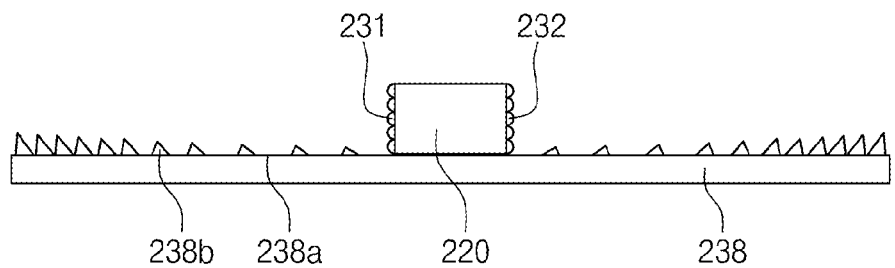
FIG. 28 is a cross-sectional view taken along line VIII-VIII' shown in FIG. 27.

FIG. 28 is a cross-sectional view taken along line VIII-VIII' shown in FIG. 27.

Referring to FIG. 28, reflection patterns 238b are disposed or defined on an upper surface 238a of the reflection sheet 238. In an exemplary embodiment, as shown in FIG. 28, the reflection patterns 238b have an embossing shape protruded from the upper surface 238a, but not being limited thereto. In an alternative exemplary embodiment, the reflection patterns 238b may have a recessing shape recessed from the upper surface 238a. The reflection patterns 238b refract or reflect the lights exiting through the first and second control patterns 231 and 232 of the light guide bar 220 to guide the lights to the diffusion plate 235. Thus, the light exit efficiency of the backlight unit 200c may be improved.

A size or height of or distances between the reflection patterns 238b may be controlled such that the density of the reflection patterns 238b is increased as the reflection patterns 238b are farther from the light guide bar 220, but the control of the density of the reflection patterns 238b is not limited thereto or thereby. In such an embodiment, the density of the reflection patterns 238b may be variously modified to enhance the whole brightness of the backlight unit 200c.

In an exemplary embodiment, the shape of the reflection patterns 238b may have a triangular shape as shown in FIG. 28, but not being limited thereto.

Figure 29:
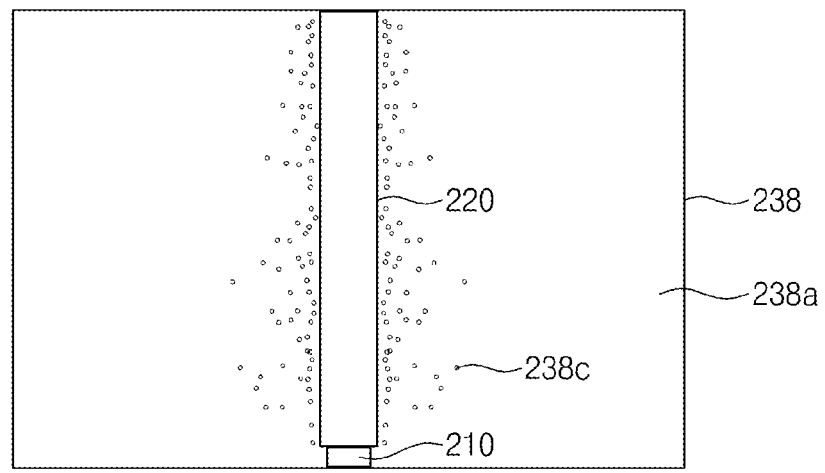
FIG. 29 is a plan view of an exemplary embodiment of a reflection sheet according to the invention.

FIG. 29 is a plan view showing an exemplary embodiment of a reflection sheet according to the invention.

Referring to FIG. 29, a reflection sheet 238 may further include absorbing patterns 238c disposed or defined on an upper surface 238a thereof. The absorbing patterns 238c absorb the light emitted from the light guide bar 220 and are disposed in areas in which the brightness is relatively high, thereby improving the uniformity of the brightness of the backlight unit 238c.

In an exemplary embodiment, as shown in FIG. 29, the absorbing patterns 238c may be provided in the areas adjacent to the light guide bar 220, but the areas in which the absorbing patterns 238c are provided are not limited thereto or thereby.

Figure 30:
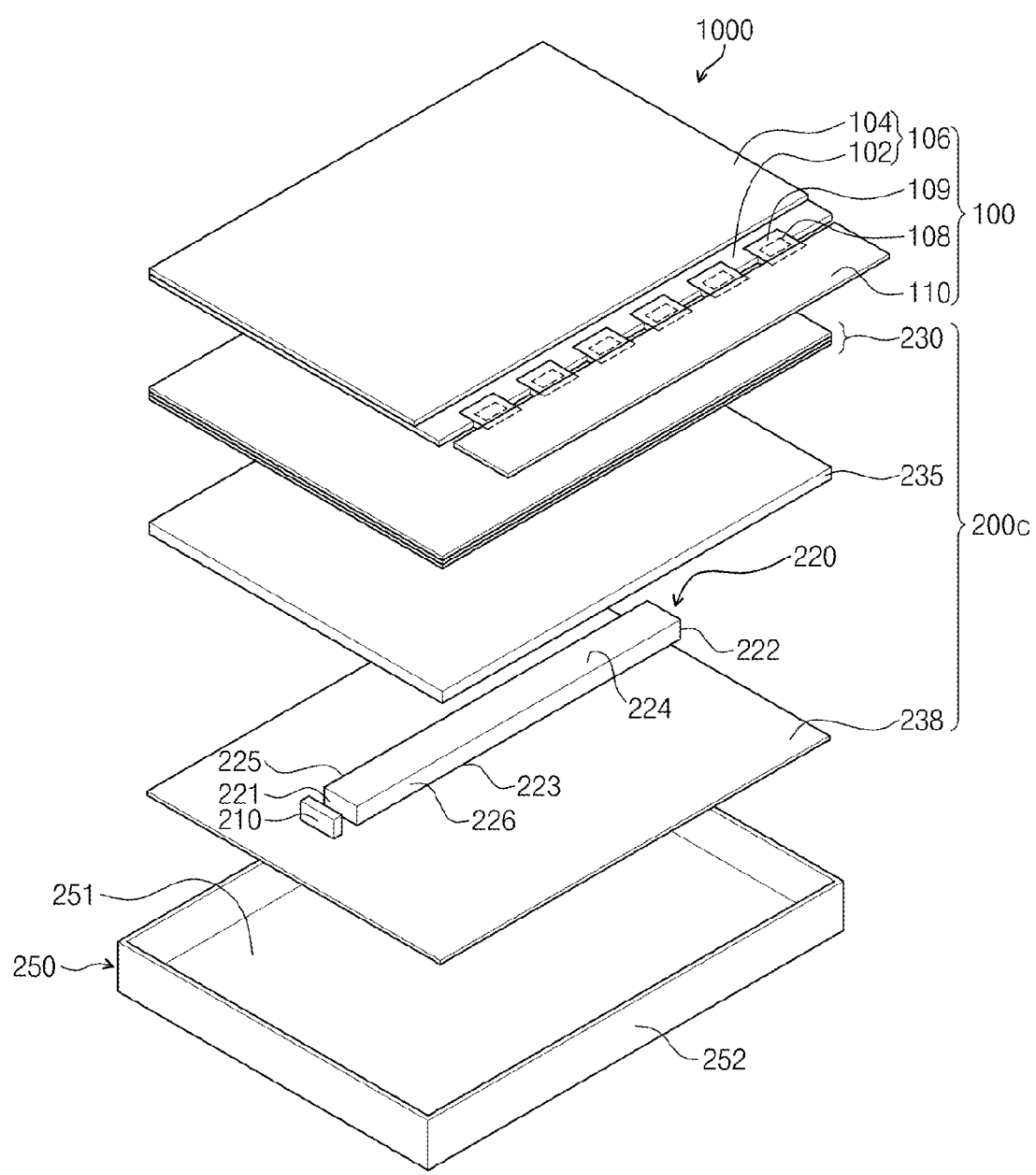
FIG. 30 is an exploded perspective view of an exemplary embodiment of a display apparatus according to the invention.

FIG. 30 is an exploded perspective view of an exemplary embodiment of a display apparatus according to the invention.

Referring to FIG. 30, an exemplary embodiment of a display apparatus 1000 includes a display unit 100 and a backlight unit 200c.

The display unit 100 includes a display panel 106 that displays the image, a driving chip 108 that applies a driving signal to the display panel 106, and a printed circuit board 110 electrically connected to the display panel 106.

In an exemplary embodiment, the display panel 106 includes a first substrate 102, a second substrate 104 facing the first substrate 102 and coupled to the first substrate 102, and a liquid crystal layer (not shown) interposed between the first substrate 102 and the second substrate 104. In an exemplary embodiment, the display panel 106 may be a liquid crystal display panel, as described above, but the display panel 106 is not limited to the liquid crystal display panel.

In an exemplary embodiment, the first substrate 102 includes a plurality of pixels arranged substantially in a matrix form and each pixel includes a gate line (not shown), a data line (not shown) insulated from the gate line and crossing the gate line, and a pixel electrode (not shown). In such an embodiment, each pixel includes a thin film transistor (not shown) connected to the gate line, the data line and the pixel electrode.

The second substrate 104 may include color pixels of primary colors (not shown), e.g., red, green and blue color pixels, and a common electrode (not shown) facing the pixel electrode. The color pixels and the common electrode may be disposed on the first substrate 102. The liquid crystal layer includes liquid crystal molecules aligned in accordance with an intensity of electric field generated between the pixel electrode and the common electrode, and thus the transmittance of the light provided from the backlight unit 200c is controlled, thereby displaying an image with a gray scale corresponding to the intensity of the electric field.

When viewed in a plan view, the driving chip 108 is disposed at a side portion of the first substrate 102 to apply a data signal to the data line. The driving chip 108 generates the data signal applied to the data line of the display panel 108 in response to an external signal. The external signal is provided from the printed circuit board and includes various signals, such as an image signal, various control signals and a driving voltage, for example.

The first substrate 102 includes a gate driving circuit disposed at another side portion thereof to apply a gate signal to the gate line. The gate driving circuit may be disposed at the side portion through a thin film process used to provide or manufacture the display panel 106. Accordingly, the gate driving circuit may be built in the display panel 106.

In an alternative exemplary embodiment, the driving chip 108 may include two or more chips configured to include a data driving chip and a gate driving chip and may be mounted on the first substrate 102 by a chip on glass ("COG") scheme.

The printed circuit board 110 may be electrically connected to the display panel 106 by a plurality of tape carrier packages ("TCP"s) 109. The driving chip 108 may be disposed or mounted on each of the TCPs 109. The TCPs 109 may be bent to cover the side surface of the backlight unit 200c.

In an exemplary embodiment, the printed circuit board 110 connected to the TCPs 109 is disposed under the backlight unit 200c. In such an embodiment, the display apparatus 1000 may further include a shield case (not shown) disposed under the backlight unit 200c to protect the printed circuit board 110. In an alternative exemplary embodiment, the printed circuit board 110 may be disposed on the sidewall of the backlight unit 200c.

The backlight unit 200c shown in FIG. 30 is substantially the same as the backlight unit described above with reference to FIGS. 1 to 27, and any repetitive detailed description will be omitted.

In such an embodiment, the display apparatus 1000 may further include a top cover coupled to the bottom chassis 250 to cover an edge of the display panel 106.

Although some exemplary embodiments of the invention have been described herein, it is understood that the invention should not be limited to these exemplary embodiments but various changes and modifications can be made by one ordinary skilled in the art within the spirit and scope of the invention as hereinafter claimed.

What is claimed is:

1. A backlight unit which provides light to a display panel, the backlight unit comprising:
    a light source which emits a first light;
    a light guide bar extending substantially in a first direction, wherein the light guide bar receives the first light through an incident surface thereof, and guides the first light to convert the first light to a second light; and
    a control pattern disposed on each of opposing side surfaces of the light guide bar, which extends in the first direction, wherein the control pattern converts the second light to a third light, and has a shape extending in the first direction to control an exit angle of the third light,
    wherein a shape of the control pattern disposed on one of the opposing side surfaces is substantially symmetrical to a shape of the control pattern disposed on the other of the opposing side surfaces with respect to an imaginary line crossing a center portion of the light guide bar along a thickness direction, and
    wherein the opposing side surfaces are not a surface parallel to the display panel.

2. The backlight unit of claim 1, wherein the control pattern has a lenticular lens shape extending substantially in the first direction.

3. The backlight unit of claim 1, wherein the control pattern has a prism shape extending substantially in the first direction.

4. The backlight unit of claim 1, wherein the light guide bar has a triangular shape, a rectangular shape, a pentagonal shape, or a semi-circular shape when viewed from a transverse cross-sectional view taken along a second direction substantially perpendicular to the first direction.

5. The backlight unit of claim 4, wherein
    the light guide bar has the rectangular shape when viewed from the transverse cross-sectional view,
    the light guide bar comprises:
        a bottom surface;
        an upper surface facing the bottom surface; and
        first and second side surfaces connecting the bottom surface and the upper surface,
        wherein the control pattern is disposed on each of the first and second side surfaces.

6. The backlight unit of claim 5, further comprising:
    a light exit pattern disposed on at least one of the first and second side surfaces to allow the first light to exit as the second light from the first and second side surfaces,
    wherein the control pattern is disposed on the first and second side surfaces having the light exit pattern.

7. The backlight unit of claim 6, wherein
    the light exit pattern is disposed on the first and second side surfaces without being disposed on the upper surface, and
    the third light at an angle in a range from about +80° to about +90° and a range from about −80° to about −90° with respect to the imaginary line crossing the center portion of the light guide bar along the thickness direction has a peak brightness, and the brightness of the third light at an angle in a range from about −50° to about 50° with respect to the imaginary line is equal to or less than about ⅛ of the peak brightness of the third light.

8. The backlight unit of claim 7, wherein the brightness of the third light at an angle in a range from about −60° to about 60° with respect to the imaginary line is equal to or less than about 1/12 of the peak brightness.

9. The backlight unit of claim 5, further comprising:
a plurality of light exit patterns to allow the first light to exit as the second light,
wherein the light exit pattern comprises:
a first light exit pattern disposed on the upper surface; and
a second light exit pattern disposed on the first and second side surfaces,
wherein the control pattern is disposed on the first and second side surfaces having the second light exit patterns, and
wherein the second light exit pattern has a density greater than a density of the first light exit pattern.

10. The backlight unit of claim 9, wherein
the density of the first light exit pattern increases as the first light exit pattern is farther from the light source, and
the density of the second light exit pattern increases as the second light exit pattern is farther from the light source.

11. The backlight unit of claim 1, wherein the light source is disposed at one end among opposing ends of the light guide bar.

12. The backlight unit of claim 11, wherein a width in a second direction of the light guide bar, which is substantially perpendicular to the first direction, is substantially constant along the first direction.

13. The backlight unit of claim 11, wherein a width in a second direction of the light guide bar, which is substantially perpendicular to the first direction, becomes small along the first direction as a position at which the width is measured is farther from the light source.

14. The backlight unit of claim 1, wherein the light source is disposed at both ends of the light guide bar.

15. The backlight unit of claim 1, wherein at least two light sources are disposed at at least one end among opposing ends of the light guide bar.

16. The backlight unit of claim 1, further comprising:
a diffusion plate disposed above the light guide bar to diffuse the third light; and
a reflection sheet disposed under the light guide bar to reflect the third light to the diffusion plate.

17. The backlight unit of claim 16, wherein the reflection sheet comprises reflection patterns which guides the third light exiting from the light guide bar to the diffusion plate.

18. The backlight unit of claim 1, further comprising:
a receiving container which accommodates the light source and the light guide bar.

19. The backlight unit of claim 18, further comprising:
a plurality of light guide bars extending substantially in a lengthwise direction of the receiving container, and
the light guide bars are arranged substantially in a widthwise direction of the receiving container.

20. The backlight unit of claim 18, further comprising:
a plurality of light guide bars extending substantially in a widthwise direction of the receiving container, and
the light guide bars are arranged substantially in a lengthwise direction of the receiving container.

21. A display apparatus comprising:
a backlight unit comprising:
a light source which emits a first light;
a light guide bar which extends in a first direction, receives the first light through an incident surface thereof, and guides the first light to convert the first light to a second light;
a control pattern disposed on each of opposing side surfaces of the light guide bar, which extends in the first direction, wherein the control pattern converts the second light to a third light, and has a shape extending in the first direction to control an exit angle of the third light; and
a diffusion plate which diffuses the third light; and
a display panel which receives the diffused third light exiting from the diffusion plate and displays an image,
wherein a shape of the control pattern disposed on one of the opposing side surfaces is substantially symmetrical to a shape of the control pattern disposed on the other of the opposing side surfaces with respect to an imaginary line crossing a center portion of the light guide bar along a thickness direction, and
wherein the opposing side surfaces are not a surface parallel to the display panel.

22. The display apparatus of claim 21, wherein the control pattern has a lenticular lens shape or a prism shape, which extends in the first direction.

23. The display apparatus of claim 21, wherein
the light guide bar has a rectangular shape when viewed from a transverse cross-sectional view thereof, and
the light guide bar comprises:
a bottom surface;
an upper surface facing the bottom surface; and
first and second side surfaces connecting the bottom surface and the upper surface,
wherein the control pattern is disposed on each of the first and second side surfaces.

24. The display apparatus of claim 23, further comprising:
a light exit pattern disposed on at least one of the first and second side surfaces to allow the first light to exit as the second light from the first and second side surfaces,
wherein the control pattern is disposed on the first and second side surfaces having the light exit pattern.

25. The display apparatus of claim 24, wherein
the light exit pattern is disposed on the first and second side surfaces without being disposed on the upper surface, and
the third light at an angle in a range from about +80° to about +90° and a range from about −80° to about −90° with respect to the imaginary line crossing the center portion of the light guide bar along the thickness direction has a peak brightness, and the brightness of the third light at an angle in a range from about −50° to about 50° with respect to the imaginary line is equal to or less than about 1/8 of the peak brightness of the third light.

* * * * *